US006634082B1

(12) United States Patent
Ziegler et al.

(10) Patent No.: US 6,634,082 B1
(45) Date of Patent: Oct. 21, 2003

(54) METHOD OF MAKING A CARBON COMMUTATOR ASSEMBLY

(76) Inventors: William E. Ziegler, 92 Hartshorn St., Reading, MA (US) 15857; William A. Bauer, P.O. Box 1030, St. Mary's, PA (US) 15857

( * ) Notice: Subject to any disclaimer, the term of this patent is extended or adjusted under 35 U.S.C. 154(b) by 0 days.

(21) Appl. No.: 09/217,528

(22) Filed: Dec. 21, 1998

Related U.S. Application Data

(62) Division of application No. 09/070,977, filed on May 1, 1998, now Pat. No. 5,932,949.

(51) Int. Cl.[7] ........................ H01R 43/06; B29C 51/00; B23K 31/02

(52) U.S. Cl. ..................... 29/597; 29/840; 29/DIG. 29; 29/DIG. 12; 228/903; 264/272.19; 264/272.2

(58) Field of Search .......................... 29/597, 846, 840, 29/596, DIG. 29, DIG. 12; 310/42–45, 233, 235, 236; 264/272.19, 272.2; 228/179.1, 903

(56) References Cited

U.S. PATENT DOCUMENTS

| | | | | |
|---|---|---|---|---|
| 3,538,365 A | | 11/1970 | Reisnecker | |
| 3,861,027 A | | 1/1975 | Allen | |
| 4,358,319 A | | 11/1982 | Yoshida et al. | |
| 4,358,506 A | | 11/1982 | Intrater et al. | |
| 4,374,903 A | | 2/1983 | Intrater et al. | |
| 4,396,677 A | | 8/1983 | Intrater et al. | |
| 4,510,276 A | * | 4/1985 | Leech et al. | 523/427 |
| 4,535,029 A | | 8/1985 | Intrater et al. | |
| 5,157,299 A | * | 10/1992 | Gerlach | 310/237 |
| 5,175,463 A | * | 12/1992 | Farago et al. | 310/237 |
| 5,255,426 A | | 10/1993 | Farago et al. | |
| 5,386,167 A | | 1/1995 | Strobl | |
| 5,409,593 A | * | 4/1995 | Moskowitz | 205/117 |
| 5,442,849 A | | 8/1995 | Strobl | |
| 5,530,311 A | | 6/1996 | Ziegler | |
| 5,552,652 A | | 9/1996 | Shimoyama et al. | |
| 5,826,324 A | * | 10/1998 | Abe et al. | 264/272.19 |

FOREIGN PATENT DOCUMENTS

| | | |
|---|---|---|
| FR | 2 633 781 A | 7/1989 |

OTHER PUBLICATIONS

J. Intrater, "Review of Some Processes For Ceramic–To––Metal Joining", *Materials & Manufacturing Processes, 8(3), 353–373 (1993).*

"Sputtering Target Bonding", *ATI Materials.* "A New Direction In Surface Analysis", TTS 100 Oryx Technology Corporation.

"Electromagnet Systems", *ATI Magnetics.* "SurgX™ ESD Protection On Board", Oryx Technology Corporation, Feb. 1995.

James Intrater, "Intragene™ Metallization On 96% $A1_2 0_3$ And A1N: Solder Pull Strength Data", pp 1–3, Oryx Technology Corporation.

(List continued on next page.)

*Primary Examiner*—A. Dexter Tugbang
(74) *Attorney, Agent, or Firm*—Reising, Ethington, Barnes, Kisselle, P.C.

(57) ABSTRACT

A method for making a carbon commutator assembly by forming an annular carbon cylinder of a conductive carbon composition and metalizing an inner surface of the carbon cylinder by bonding a first layer of metallic material to the inner surface of the carbon cylinder. A metallic substrate is soldered to the metalized inner surface of the carbon cylinder and an insulator hub is disposed in a position supporting the metallic substrate and carbon cylinder. The carbon cylinder and substrate are then segmented by forming radial interstices through the carbon cylinder and the metallic substrate thus forming a carbon/metal commutator array comprising electrically isolated carbon/metal commutator sectors.

18 Claims, 11 Drawing Sheets

OTHER PUBLICATIONS

James Intrater, “Intragene™ Metallization On CVD–Diamond Coated $Si_3N_4$”, pp 1–3, Oryx Technology Corporation.

James Intrater. “The Challenge of Bonding Metals to Ceramics”, Technical Bulletin, Ceramic/Metal Bonding, Advanced Technology, Inc., Reprinted from *Machine Design* Nov. 23, 1989.

James Intrater, “How to Select the Right Metallization/ Joining Method”, Advanced Technology, Inc., Reprinted from *Ceramic Industry* Feb. 1991, *Business News Publishing Company*.

* cited by examiner

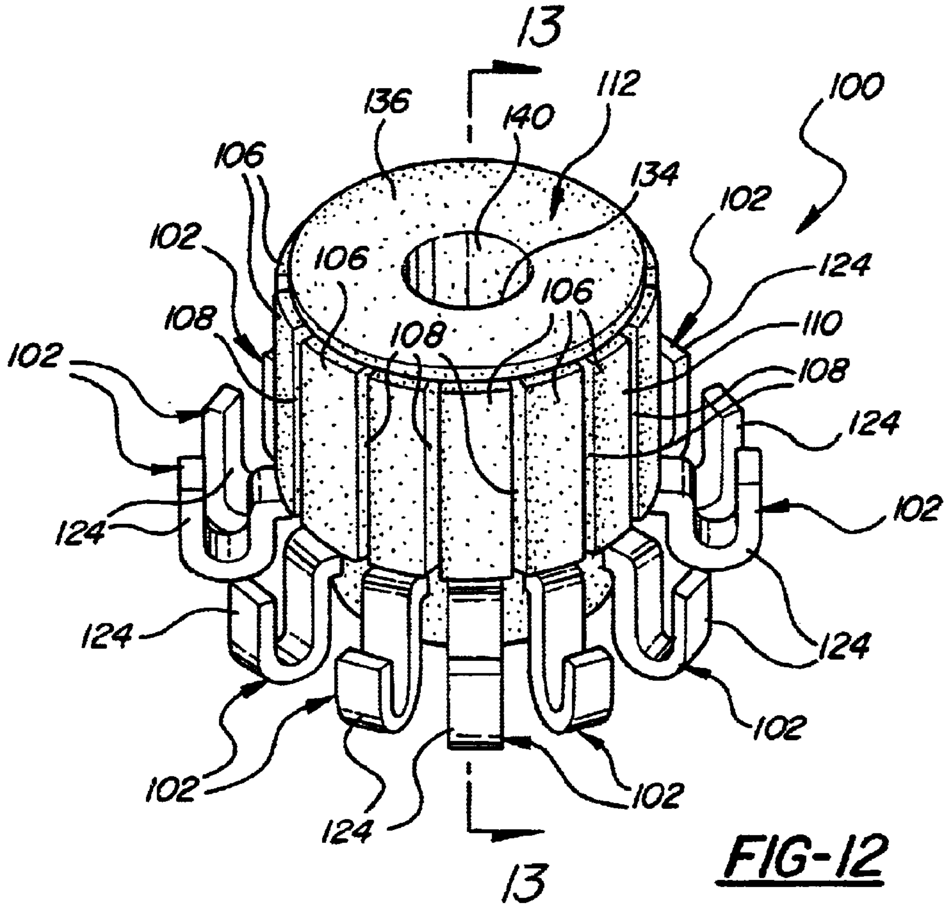
FIG-12
FIG-13
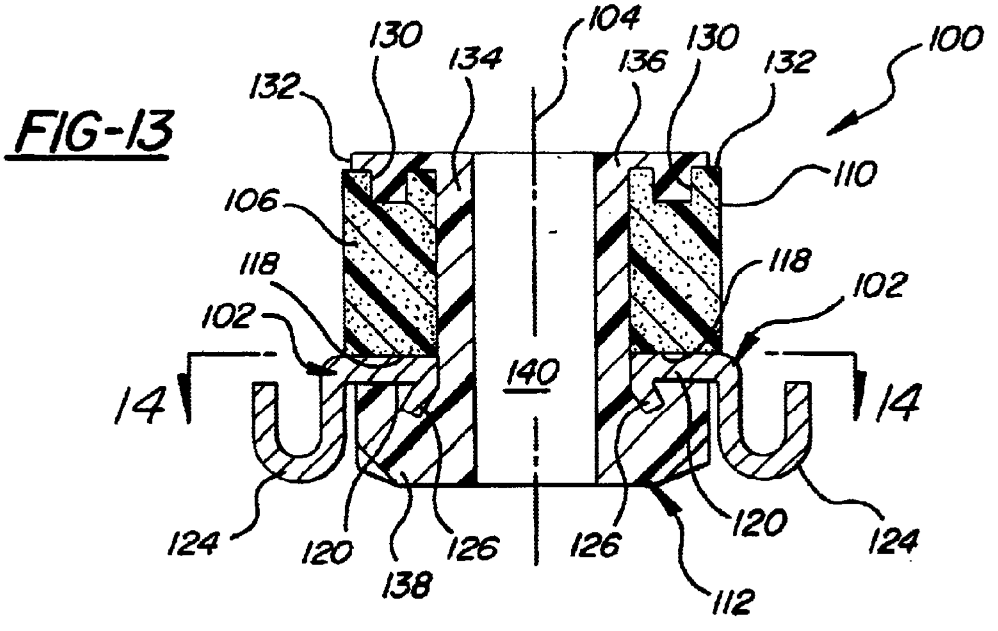

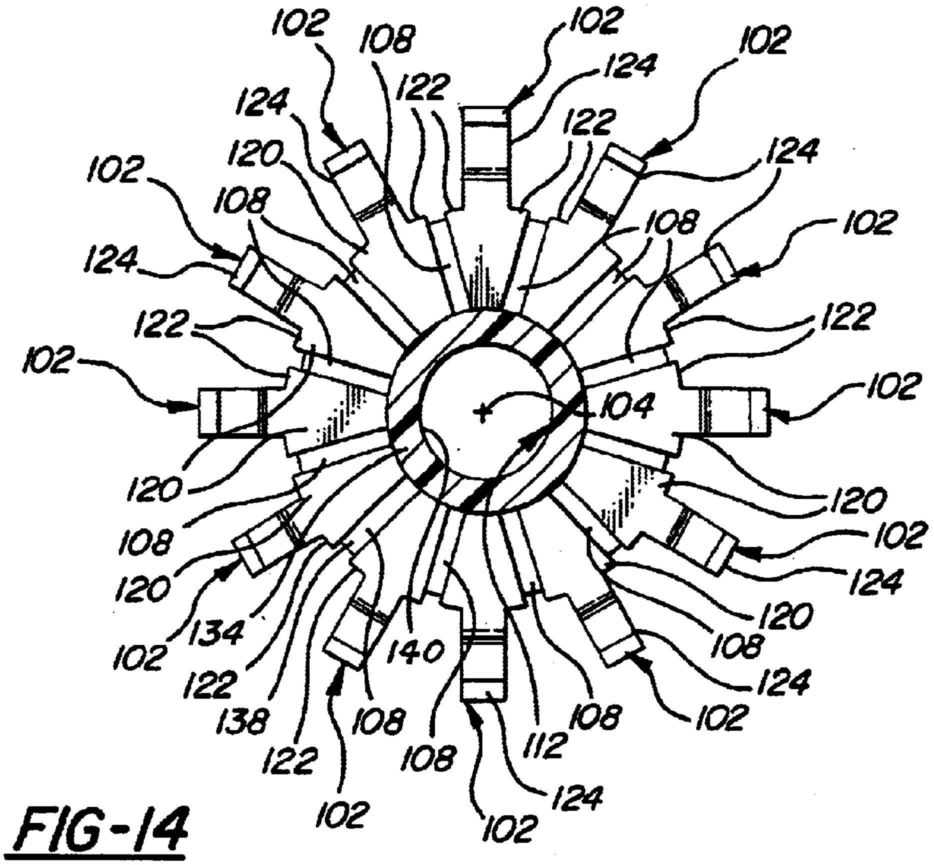
FIG-14
FIG-15
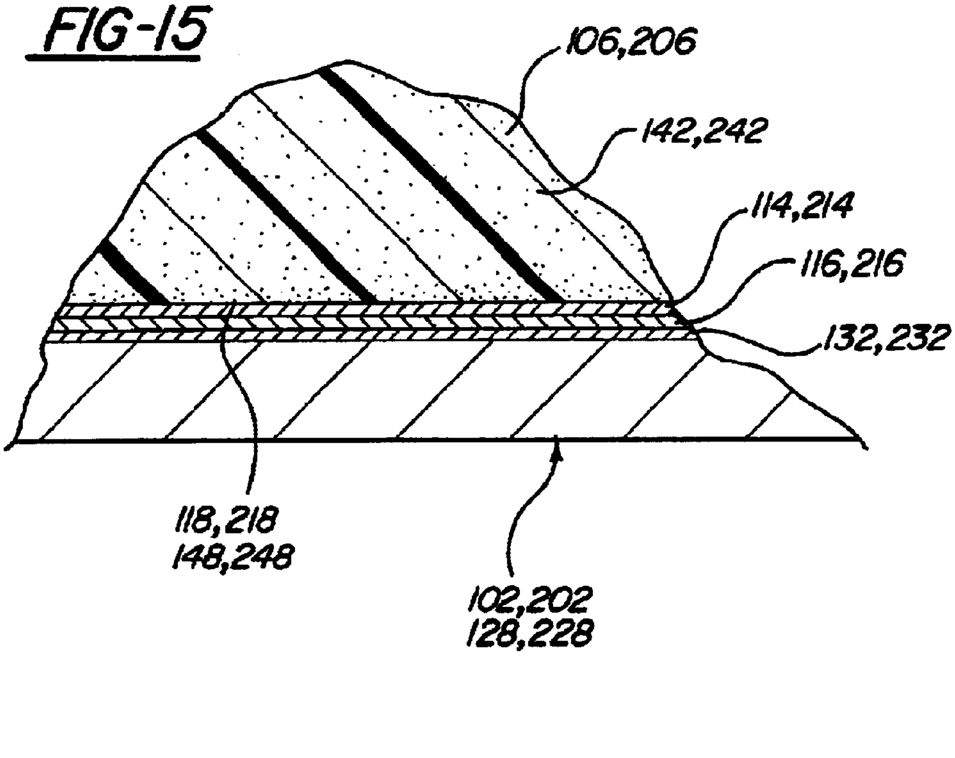

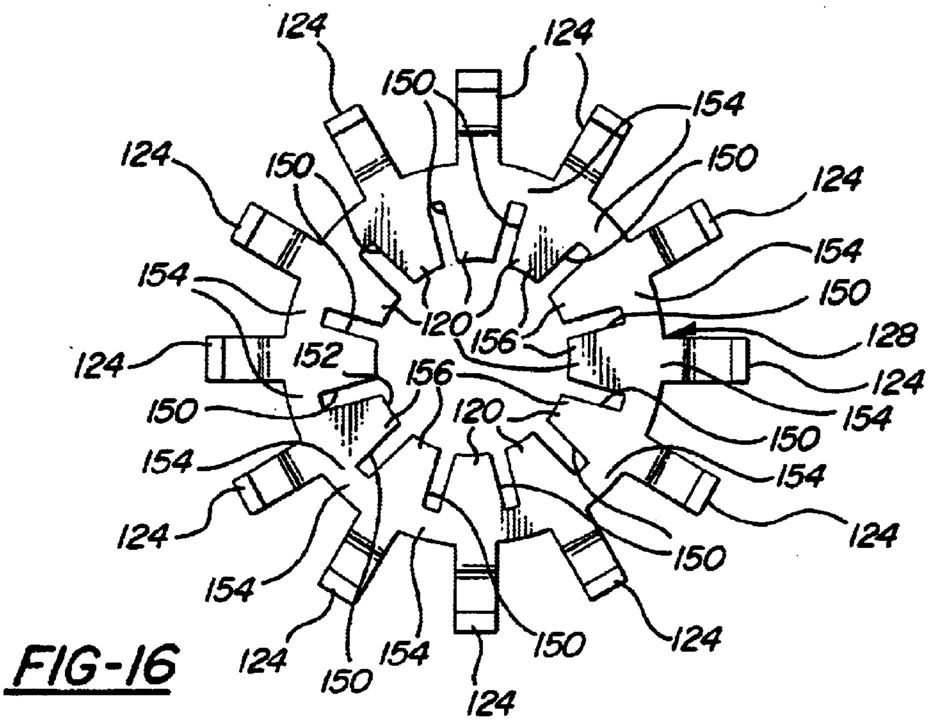
FIG-16
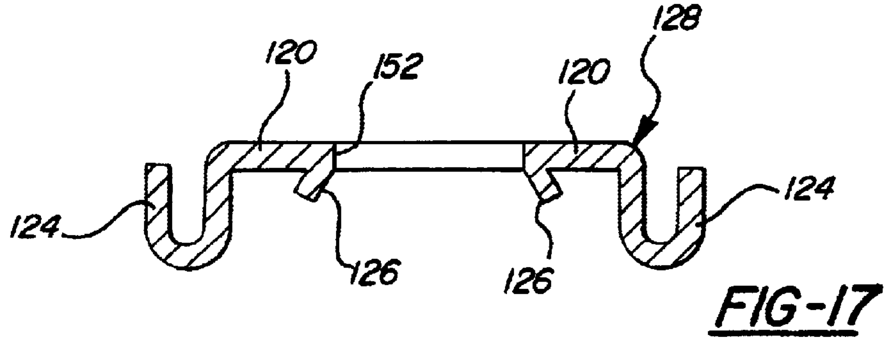
FIG-17
FIG-18
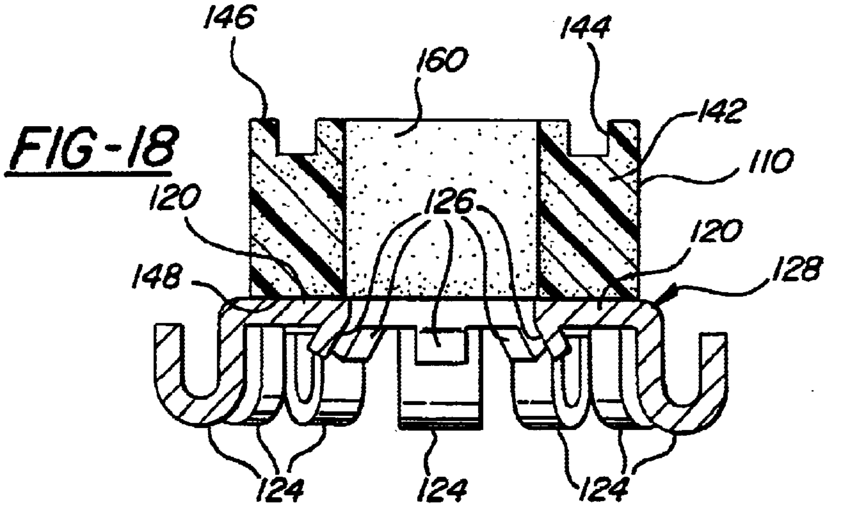

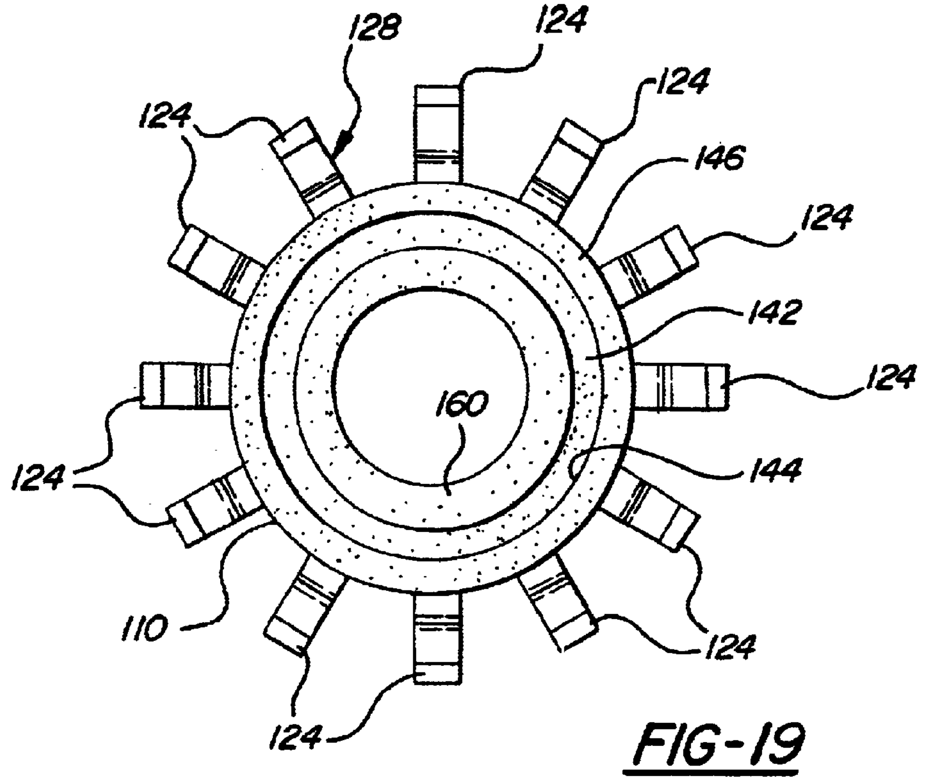
FIG-19
FIG-20
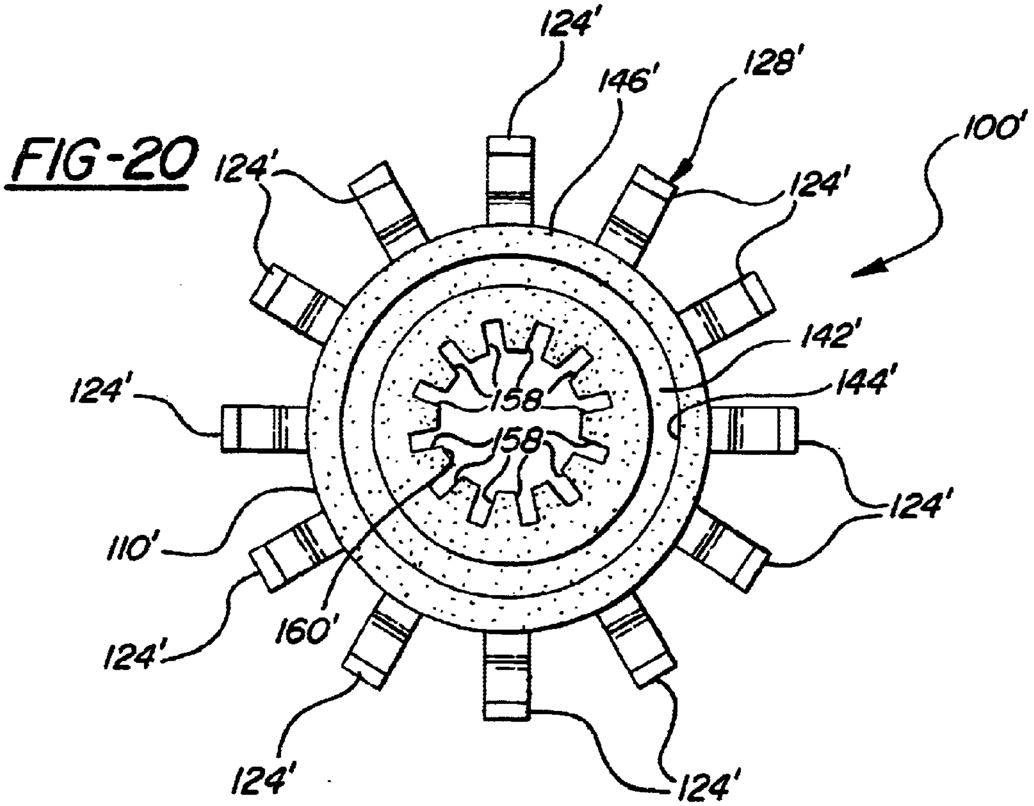

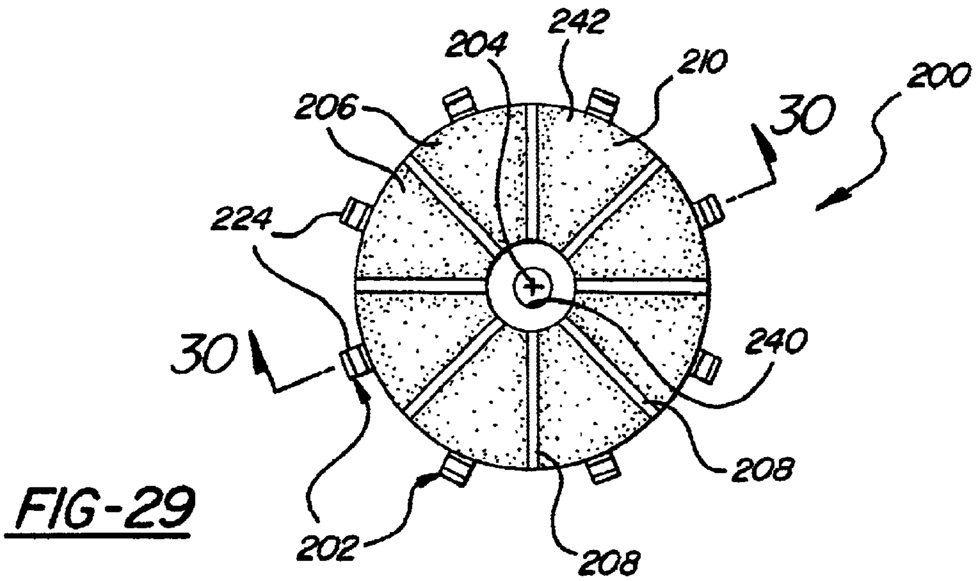
FIG-29
FIG-30
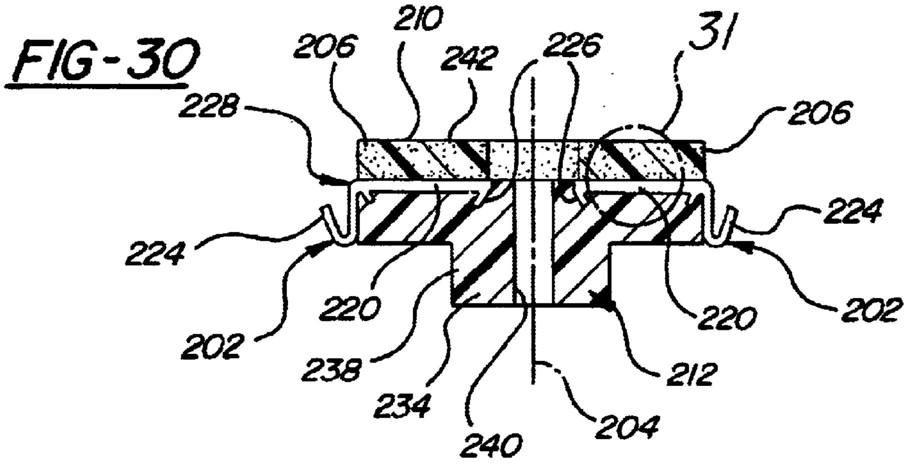
FIG-31
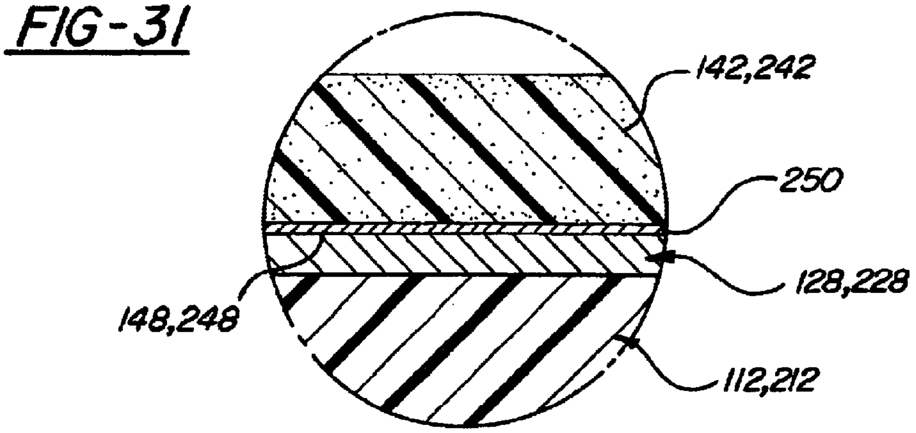

METHOD OF MAKING A CARBON COMMUTATOR ASSEMBLY

This is a divisional of U.S. patent application Ser. No. 09/070,977 filed may 1, 1998 now U.S. Pat. No. 5,932,949.

TECHNICAL FIELD

This invention relates generally to a carbon-segment commutator for an electric motor and a method for its manufacture.

BACKGROUND OF THE INVENTION

Permanent magnet direct current motors are sometimes used for submerged fuel pump applications. These motors typically employ either face-type commutators or cylinder or "barrel"-type commutators. Face-type commutators have planar, circular commutating surfaces disposed in a plane perpendicular to the axis of armature rotation. Barrel-type commutators have arcuate, cylindrical commutating surfaces disposed on the outer side surface of a cylinder that is positioned coaxially around the axis of armature rotation. Regardless of their commutating surface configurations, electric motors used in submerged fuel pump applications must be small and compact, have a long life, be able to operate in a corrosive environment, be economical to manufacture and operate and be essentially maintenance-free.

Submerged fuel pump motors must sometimes operate in a fluid fuel medium containing an oxygen compound, such as methyl alcohol and ethyl alcohol.

The alcohol increases the conductivity of the fuel and, therefore, the efficiency of an electrochemical reaction that deplates any copper motor components that are exposed to the fuel. For this reason, carbon and carbon compositions are sometimes used to form carbon segments with segmented commutating surfaces for the motors. This is because carbon commutators do not corrode or "deplate", as copper commutators do. Commutators with carbon segments also typically include metallic contact sections that are in electrical contact with the carbon segments and provide a terminal for physically connecting each electrical contact to an armature coil wire.

It is known to form a carbon commutator by first molding and heat treating a moldable carbon compound or machining heat-treated carbon or carbon/graphite stock. Such an arrangement is shown in German Disclosure 3150505.8. A commutator-insulating hub may be formed to support a metallic substrate. The hub may be molded directly to the metallic substrate. Slots are machined through the carbon article and the metallic substrate to separate the carbon article and substrate into a number of electrically isolated segments. An inner diameter, outer diameter and the commutating surface of the commutator may also need to be machined.

After the completed commutator is assembled to an armature, a clamshell mold may be positioned over the newly assembled commutator-armature in a final overmolding process. With face-type commutators, an open end of the clam shell mold is made to seal around commutator in a manner that leaves the commutating surface exposed. Insulator material is then injected into the clam shell mold. Once the insulator material has cured, the clam shell mold is removed. This final overmolding step protects copper armature windings and other corrosion-prone elements from chemically reacting with ambient fluids such as oxygenated fuels. The overmolding also secures wires to reduce potential for stress failures and to maintain a corrected dynamic balance level. Overmolding will also reduce windage losses in the pump.

When, in manufacturing a carbon commutator with a metallic substrate, cuts are machined into or through the metallic substrate, metal chips may be produced. These metal chips can lodge in the slots between carbon segments causing electrical failures. Machining into a metallic substrate can also expose the cut portions of the substrate to the corrosive effects of oxygenated fuels.

Where the carbon and metal substrate portions or a commutator are machined-through to form electrically isolated segments, some type of support structure must be provided to strengthen the commutator and mechanically bind the carbon segments and conductor sections together. Such support structures sometimes require substantial additional axial space for the commutator, which can increase the overall axial length of the armature-commutator assembly and or reduce the size and the quantity of wire wound in the armature.

For some types of electrical-conducting resin-bonded carbon compositions, an insulating surface skin characteristically forms on exterior surfaces of the composition as it cures. This skin forms an impediment to electrical contact between the carbon composition and the metallic conductor sections. Therefore, a carbon commutator using such a composition must provide an electrical path through the insulating surface skin.

One approach to solving these problems is disclosed in U.S. Pat. No. 5,386,167 issued Jan. 31, 1995 to Strobi (the Strobi patent). The Strobi patent shows a face-type commutator having eight carbon segments formed from an electrical-conducting resin-bonded carbon composition. To avoid problems associated with machining into metal substrates, the carbon segments are formed by overmolding a carbon disk onto eight pie-piece-shaped copper segments then radially cutting between the segments to form the electrically isolated carbon segments. A plastic substrate holds the copper segments in position for carbon overmolding and provides mechanical interlock between the carbon segments. However, the plastic substrate increases the axial thickness of the commutator. In addition, the Strobi patent does not provide structures that would provide an electrical path through carbon composition skinning or structures that might otherwise reduce electrical resistance.

U.S. Pat. No. 4,358,319 issued Nov. 9, 1982 to Yoshida et al. discloses a barrel-type carbon commutator assembly that includes an annular cylindrical array of carbon segments. Each carbon segment has an outer semi-circumferential side surface for making physical and electrical contact with a brush. A retention groove extends around an inner circumferential surface of the carbon segment array. The carbon segments are electrically isolated from each other by longitudinal cuts. A hub comprising insulating material is disposed within the annular carbon segment array and engages the retention groove at the top end of each carbon segment.

To manufacture this commutator Yoshida et al. discloses a method that includes the steps of forming an annular carbon cylinder with a retention groove, over-molding the carbon cylinder with insulator material to form a hub and machining slots in the over-molded barrel to form electrically isolated barrel segments. The electrical connections between carbon segments and coil wires are made by soldering or gluing the wires directly to the carbon segments themselves.

A fuel pump supplied by Bosch to Mercedes Benz shows a barrel-style commutator that includes a cylindrical commutating surface formed by a cylindrical array of carbon segments. Radial inner surfaces of the carbon segments form a composite inner circumferential surface of the carbon segment array. The carbon segments are electrically connected to respective coil wires by copper substrate sections soldered to the respective radial inner surfaces of the carbon segments. Each copper substrate section includes a terminal for supporting the end of a coil wire.

The Bosch commutator appears to be formed by fitting and soldering a tube portion of a copper substrate to the inner circumferential surface of the carbon cylinder. Radial cuts are then made to form and electrically isolate the carbon segments and copper substrate sections from each other. An over-molded insulator holds the carbon segments and copper substrate sections together. This process requires that a copper substrate be fabricated to include wire terminals and a tube portion closely toleranced to fit within the inner circumferential surface of the carbon cylinder. The Bosch process also requires that a difficult soldering operation be performed between the inner circumferential surface of the carbon cylinder and the outside diameter of the copper tube.

U.S. Pat. No. 5,255,426 issued Oct. 26, 1993 to Farago et al. discloses a face-type carbon commutator manufactured by first forming an annular or toroidal carbon cylinder comprising fine-grained electrical-grade carbon. Next, a cylinder base end surface is plated with a layer of a conductive material such as nickel. A layer of a conductive material such as copper is then plated over the nickel plating. The plated base end surface of the cylinder is then soldered to a substrate. Lateral slots are then machined axially downward into a top commutating surface opposite the base surface of the carbon cylinder. The slots are cut axially through the carbon and the copper substrate to form the electrically isolated carbon/copper commutator sectors.

What are needed are both face and barrel-type carbon-segment commutators that are stronger and provide lower electrical resistance through improved electrical contact between carbon segments and metallic substrates. Also needed are methods for manufacturing such commutators that are quick, easy and inexpensive.

SUMMARY OF THE INVENTION

In accordance with this invention a carbon-segment commutator assembly is provided in which a carbon disk is molded over a pre-stamped metallic substrate having an upturned projection, and an insulator hub is molded over the carbon-overmolded substrate prior to cutting radial slots. The commutator assembly comprises an annular array of at least two circumferentially-spaced conductor sections arranged around a rotational axis and an annular array or at least two circumferentially-spaced carbon segments formed of a conductive carbon composition. Each carbon segment is molded onto at least one surface of a corresponding one of the conductor sections with the annular array defining a segmented commutating surface of the commutator. An overmolded insulator hub is disposed around and between the carbon segments. The insulator hub mechanically interlocks the carbon segments. Each conductor section has at least one conductor projection that is at least partially embedded in a corresponding one of the overmolded carbon segments.

According to one aspect of the present invention, a method is provided for making a carbon-segment commutator assembly. The method includes providing the annular array of conductor sections then forming a carbon overmold by molding an electrical-conducting resin-bonded carbon composition onto the annular conductor section array. Inner grooves are formed in an inside surface of the carbon overmold opposite the commutating surface. Next, the insulator hub is formed by overmolding the carbon overmold and conductor section array with insulator material that at least partially occupies the inner grooves and mechanically interlocks the carbon segments. Finally, machining slots inward from the commutating surface of the carbon overmold to the inner grooves forms the annular array of electrically isolated carbon segments while electrically isolating the segments from each other.

Unlike prior art commutators, the filled inner grooves of the present invention leave only a thin section of the carbon segment to be machined through to electrically isolate the carbon segments. This provides at least three benefits: shallow slots result in a stronger and/or an axially shorter commutator, less machining time is required to cut the slots, and tool wear is reduced resulting in extended tool life.

In addition, the conductor projections of the present invention reduce electrical resistance by increasing surface area contact between the conductor sections and their corresponding carbon segments. The projections also provide lower electrical resistance through increased carbon to copper contact within the carbon segments and provide an electrical path through any insulating surface skin that might form over carbon segments made of certain carbon compositions.

In accordance with another aspect of the invention, the inner grooves are formed into the carbon composition as the electrical-conducting resin-bonded carbon composition is overmolded. This obviates the need to form the inner grooves in a separate step.

In accordance with another aspect of the invention, the annular array of carbon segments defines a segmented composite outer-circumferential commutating surface of the commutator. The overmolded insulator hub is disposed on an axial top end, base end and inner circumferential surfaces of the annular array of commutator sectors to mechanically interlock the commutator sectors.

In accordance with another aspect of the invention, a circular retention groove is disposed in the top end surface of the annular array of commutator sectors. A portion of the insulator hub is disposed within the retention groove to help bind the sectors together.

In accordance with another aspect of the invention each conductor section is at least partially imbedded in one of the carbon segments and includes a conductor tang that extends radially outward from that carbon segment.

In accordance with another aspect of the invention, radial interstices separate the carbon segments. Bach interstice has an inner groove portion filled with the hub insulator material and an unfilled outer slot portion. This construction electrically isolates the carbon segments while physically binding them together in an annular array.

In accordance with another aspect of the invention, the carbon segments comprise a composition of carbon powder and carrier material. The composition may comprise metal particles embedded in the composition of carbon powder and carrier material to improve electrical characteristics. The carrier material may be selected from the group consisting of phenolic resin, a thermoset resin and a thermoplastic resin. Graphite may account for 50–80% of the weight of the carbon composition.

In accordance with another aspect of the invention the inner grooves are formed as the electrical-conducting resin-bonded carbon composition is overmolded.

In accordance with another aspect of the invention a retention groove is formed in an axial top surface of the carbon overmold as the carbon overmold is formed. The insulator material is flowed over the cop surface and into the retention groove to further secure the segments after slotting. The outer circumferential surface is left exposed to serve as a commutating surface.

In accordance with another aspect of the invention, the carbon composition is molded both over and under the annular array of conductor sections. This embeds at least a portion of the conductor section array within the carbon composition.

In accordance with another aspect of the invention, a first metallic layer is plated onto an inner surface of each carbon segment. The metallic substrate sections are soldered to the respective plated inner surfaces of the carbon segments to provide strong mechanical and electrical connections between the carbon segments and their respective substrate sections. A second metallic layer may be plated over the first metallic layer. The first metallic layer may comprise nickel and the second metallic layer may comprise copper.

In accordance with another aspect of the invention, the metallic material of the first and/or the second metallic layer is deposited within pores disposed in the inner surface of each carbon segment to improve mechanical strength and electrical conductivity.

In accordance with another aspect of the invention, the solder connecting the carbon segments to the substrate sections includes an even distribution of flux. The flux is mixed with the solder paste before soldering to insure even flux distribution and improved mechanical and electrical contact.

In accordance with another aspect of the invention, the carbon segments each have a retention groove formed adjacent an axial top end of each respective carbon segment disposed opposite the inner surface. The hub is formed into the retention groove mechanically locking the carbon segments together.

In accordance with another aspect of the invention, each substrate section includes a tang extending integrally outward into the hub. The tang is embedded in the hub to form a stronger mechanical lock between the substrate sections and the hub.

In accordance with another aspect of the invention, the hub comprises a phenolic compound.

In accordance with another aspect of the invention, each carbon segment comprises a conductive carbon composition. The composition may include one or more materials selected from the group consisting of isostatic electrographite, carbon graphite, and fine-grained extruded graphite.

In accordance with another aspect of the invention, each metallic substrate section includes a terminal that extends radially outward from the hub. Each terminal may have a U-shape to facilitate attachment of coil wires.

In accordance with another aspect of the invention, a circular array of radial interstices separates the commutator sectors. According to one embodiment, each interstice has an inner groove portion filled with the hub insulator material and an unfilled outer slot portion.

In accordance with another aspect of the invention, a method is provided for constructing a carbon commutator in which an inner surface of an annular carbon cylinder is metallized. The inner surface is metallized by bonding a first layer of metallic material to the inner surface. A metallic substrate is then soldered to the metallized inner surface of the carbon cylinder. An annular insulator hub is then provided within the carbon cylinder and radial interstices are provided through the carbon cylinder and the metallic substrate to form the electrically isolated carbon/metal commutator sectors.

In accordance with another aspect of the invention, a second layer of metallic material is bonded to the inner surface of the carbon cylinder.

In accordance with another aspect of the invention, a layer of metallic material is electroplated to the inner surface of the carbon cylinder.

In accordance with another aspect of the invention, brush-type selective plating is used to electroplate the first layer of metallic material onto the carbon cylinder inner surface. Brush-type selective plating "throws" metal molecules/ions deeper into the carbon cylinder than conventional electrolysis techniques. This results in a stronger mechanical bond and a superior electrical connection. Brush-type selective plating is also used to electroplate the second layer of metallic material onto the carbon cylinder inner surface.

In accordance with another aspect of the invention, the inner surface of the carbon cylinder is metalized by forming a thin tin-based chemical reaction zone on the inner surface of the carbon cylinder that provides true molecular bonding resulting in superior mechanical strength and electrical conductivity. The chemical reaction zone is formed by providing a tin-based metallization layer including a chemical reaction zone at the inner surface of the carbon cylinder. This is done by forming a metallic powder mixture of tin with a transition metal such as chromium. A metallization paste is then formed by mixing the metallic powder mixture with an organic binder. The paste is applied to the base end surface by painting or stencil printing, and is fired to 800–900° C. in an atmosphere including carbon monoxide. The paste may be fired in a nitrogen atmosphere because binder burnout will produce sufficient carbon monixide to support the reaction. In accordance with this same method, the substrate is soldered to the base end surface of the carbon cylinder by converting the metallization layer into a solder layer by reflowing a solder composition into the metallization layer.

In accordance with another aspect of the invention, the substrate is soldered to the carbon cylinder using a solder paste containing flux. This eliminates steps that would otherwise be required to properly distribute the flux. Solder may be applied to the inner surface of the carbon cylinder using a stencil printing process. Stencil printing reduces waste and contamination of other portions of the commutator structure. During the stencil printing process a stencil is placed over the inner surface or the carbon cylinder and a layer of solder paste is provided on the stencil and exposed portions of the carbon cylinder inner surface. The stencil is then removed from the carbon cylinder. This process leaves solder paste only in desired locations. After applying the solder paste, the substrate is aligned with the inner surface of the carbon cylinder and the substrate is then placed against the solder-coated inner surface of carbon cylinder. The assembly may then be placed in a reflow oven to help insure proper soldering.

In accordance with another aspect of the invention, a retention groove is provided in the top end of the cylinder before forming the hub. In addition, an inner groove portion of each radial interstice may be formed radially outward into the inner circumferential surface of the carbon cylinder before forming the hub instead of after.

In accordance with another aspect of the invention insulator, material is overmolded onto the carbon cylinder and metallic substrate in an insert molding process to form the hub. During the overmolding operation, the insulating material is allowed to flow into the retention groove. In embodiments with pre-formed inner grooves, the insulator material is also allowed to flow into the radial inner grooves.

In accordance with another aspect of the invention, in embodiments with pre-formed inner grooves, outer slot portions of the radial interstices are formed by machining the slot portions radially inward from an outer circumferential surface of the carbon cylinder. The outer slot portions cooperate with the insulator-filled inner groove portions to electrically isolate the commutator sectors.

In accordance with another aspect of the invention, the formation of the metallic substrate includes the stamping of a generally circular annular metallic substrate from a sheet of metal. The circular annular array of metallic substrate sections is stamped from the sheet of metal such that each substrate section includes a radially-outwardly-extending terminal and an inwardly extending tang. The substrate tangs are separated by radially-inwardly-extending slots. The substrate sections are connected by connector tabs that are easily machined through when the radial interstices are formed. Each terminal may be bent into a U-shape and a portion of each tang may be bent downward to improve mechanical retention in the overmolded hub material. The outwardly extending terminal may alternatively be stamped to form an insulation-displacement configuration.

BRIEF DESCRIPTION OF THE DRAWINGS

To better understand and appreciate the invention, refer to the following detailed description in connection with the accompanying drawings:

FIG. 12 is a perspective view of a barrel-type commutator constructed according to the invention;

FIG. 13 is a cross-sectional front view of the commutator of FIG. 12 taken along line 13—13 of FIG. 12;

FIG. 14 is a cross-sectional top view of the commutator of FIG. 12 taken along line 14—14 of FIG. 13;

FIG. 15 is a magnified fragmentary view of plated metal layers on a bottom end surface of a carbon segment of the barrel-type commutator of FIG. 12 or the face-type commutator of FIG. 30;

FIG. 16 is a top view of a substrate portion of the commutator of FIG. 12;

FIG. 17 is a cross-sectional front view of the substrate of FIG. 16;

FIG. 18 is a cross-sectional front view of a carbon cylinder portion of the commutator of FIG. 12 connected to the substrate portion of the commutator of FIG. 12;

FIG. 19 is top view of the cylinder and substrate of FIG. 18;

FIG. 20 is a top view of an alternative embodiment of the cylinder and substrate of FIG. 18;

FIG. 29 is a top view of an alternative carbon face-type commutator assembly constructed according to the present invention;

FIG. 30 is a cross-sectional view of the commutator assembly of FIG. 29 taken along line 30—30 of FIG. 29; and FIG. 31 is a magnified view of a soldered bond between a metallized layer of carbon and a copper substrate shown in FIG. 13 and FIG. 30.

DETAILED DESCRIPTION OF THE PREFERRED EMBODIMENT

A planar face-type overmolded carbon-segment commutator assembly for an electric motor is generally shown at 12 in FIGS. 1–3 and 9. A barrel-type embodiment of an overmolded carbon-segment commutator assembly is shown at 12*c* in FIGS. 21–23. Unless indicated otherwise, portions of the following description of features of the face-type commutator assembly shown in FIGS. 1–8 apply equally to like-numbered features of the barrel-type embodiment shown in FIGS. 21–28. Features of the barrel-type embodiment shown in FIGS. 21–28 will bear the suffix "c" when corresponding features of the face-type commutator are shown in FIGS. 1–8.

Figure 2:
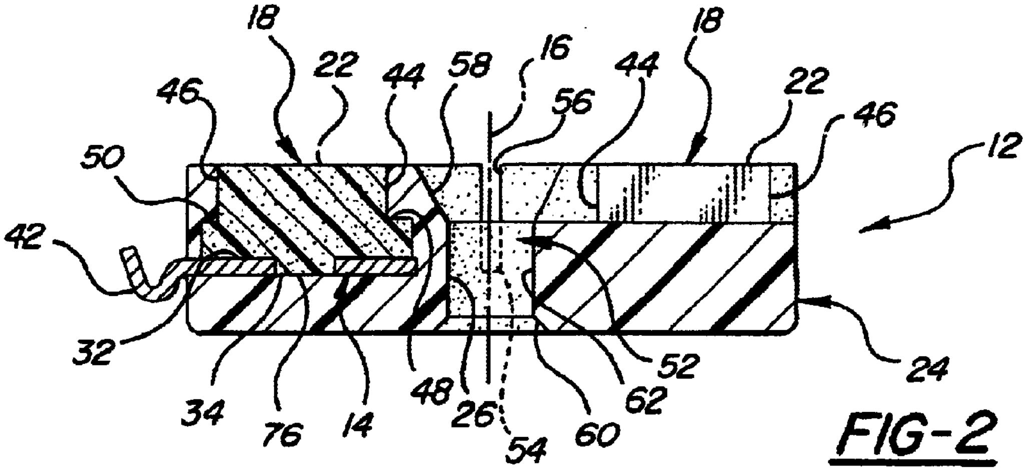
FIG. 2 is a cross-sectional view of the commutator assembly of FIG. 1 taken along line 2—2.
Figure 3:
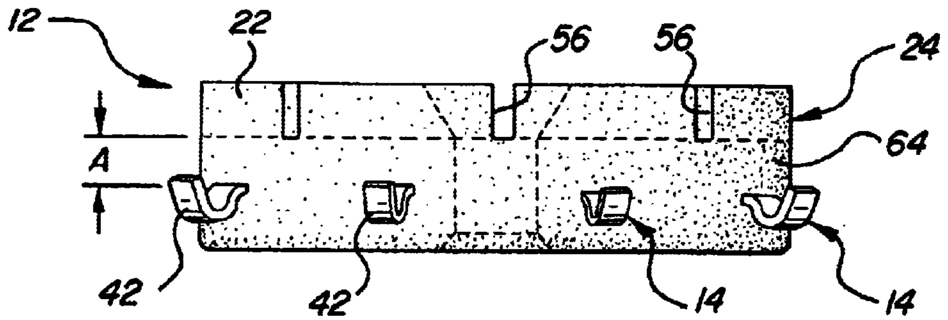
FIG. 3 is a side view of the commutator assembly of FIG. 1.
Figure 4:
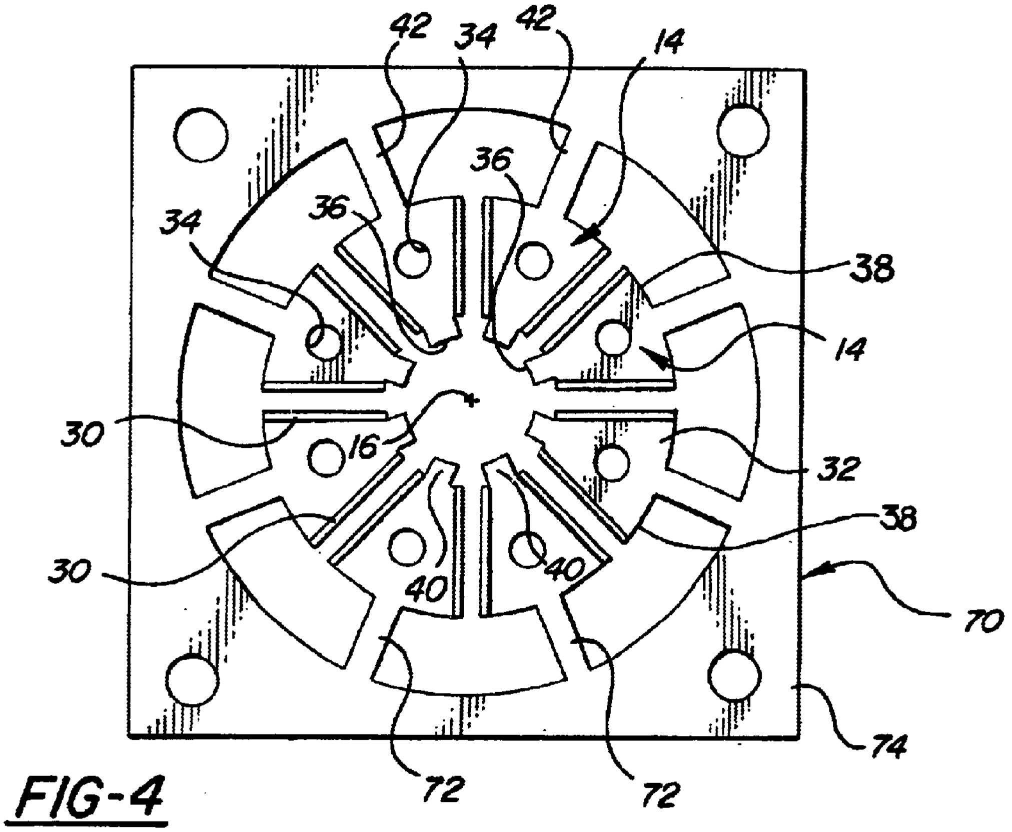
FIG. 4 is a top view of an array of copper conductor sections stamped from a square copper blank for forming a face-type commutator in accordance with the present invention.

The face-type commutator assembly 12 comprises an annular array of eight circumferentially spaced conductor sections, generally indicated at 14 in FIGS. 1–11. Each conductor section 14 is a thin, flat, roughly triangular piece of copper. The conductor sections 14 are arranged around a commutator rotational axis 16 as shown in FIGS. 1–9. Each conductor section 14 has the same general sectorial configuration as all the other conductor sections 14. In other words, and as best shown in FIG. 4, each conductor section 14 has the shape of a pie piece cut from a circular, radially-cut pie.

As generally indicated in FIGS. 1, 2, 8 and 9, the commutator assembly 12 also comprises an annular array of eight circumferentially spaced carbon segments 18. Each carbon segment 18 has the same general sectorial configuration as all the other carbon segments. The segments 18 are initially formed as a single annular carbon disk as shown at 20 in FIG. 6. The carbon disk 20 is made from an electrical-conducting resin-bonded moldable conductive carbon composition before being cut into eight equal segments 18. The carbon disk 20 or "overmold" is overmolded onto the conductor section 14 array so that when the disk 20 is cut, each carbon segment 18 is left formed onto an upper surface of a corresponding one of the conductor sections 14. The annular array of carbon segments 18 has a segmented, circular upper surface 22 that serves as the segmented commutating surface of the commutator.

Figure 1:
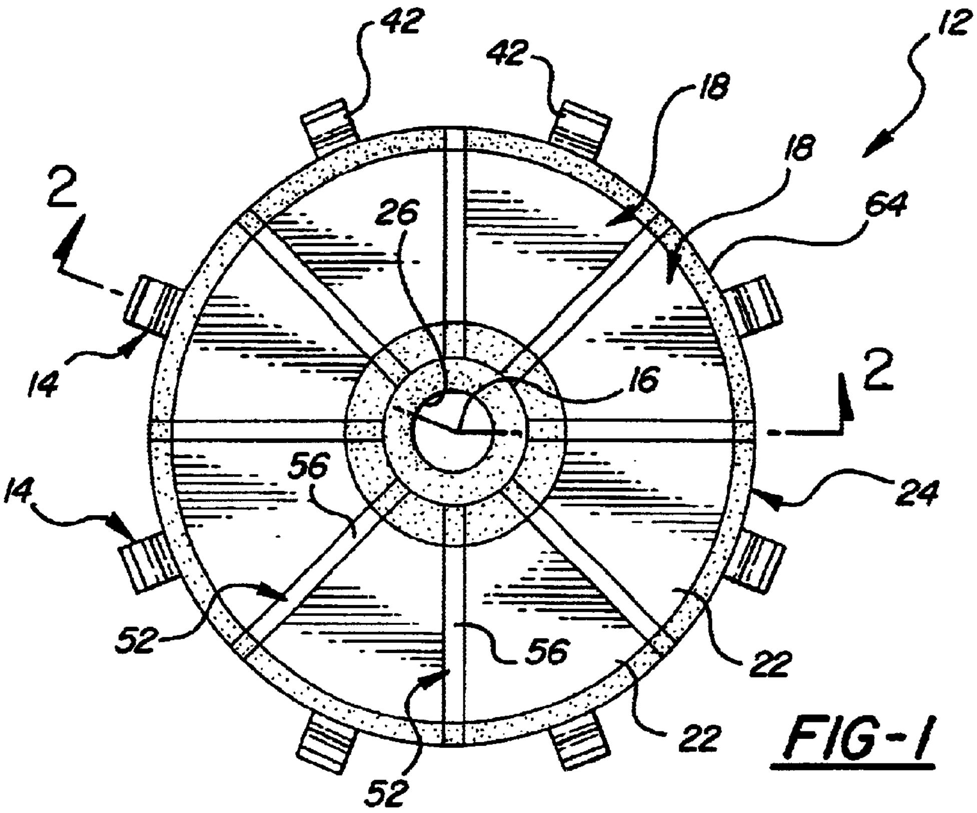
FIG. 1 is a top view of a carbon face-type commutator assembly constructed according to the present invention.
Figure 9:
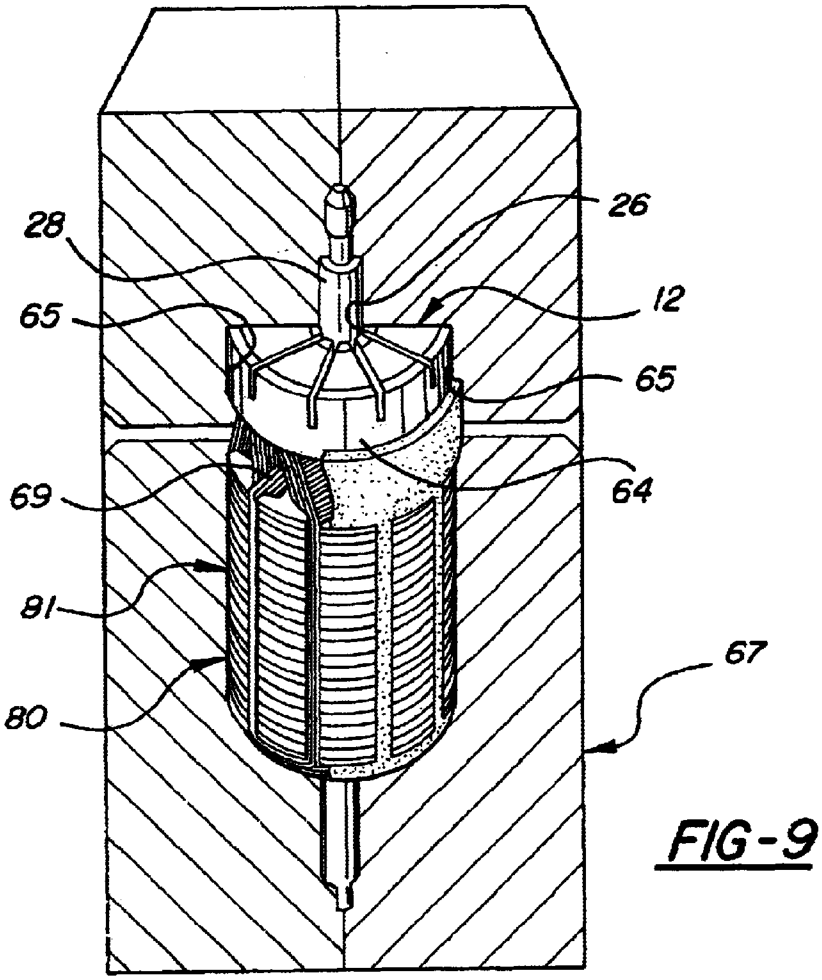
FIG. 9 is a partial cross-sectional, partially cut-away perspective view of a clamshell mold positioned around an armature assembled to a commutator assembly constructed according to the present invention.

An overmolded insulator hub, generally indicated at 24 in FIGS. 1–3, is circumferentially disposed around, under and between the carbon segments 18 and conductor sections 14. When cured, the insulator hub 24 mechanically interlocks the carbon segments 18. The insulator hub 24 has a generally cylindrical shape with a cylindrical armature shaft aperture 26 disposed coaxially along the commutator rotational axis 16. As shown in FIG. 9, the cylindrical armature shaft aperture 26 is shaped to receive an armature shaft 28.

Figure 5:
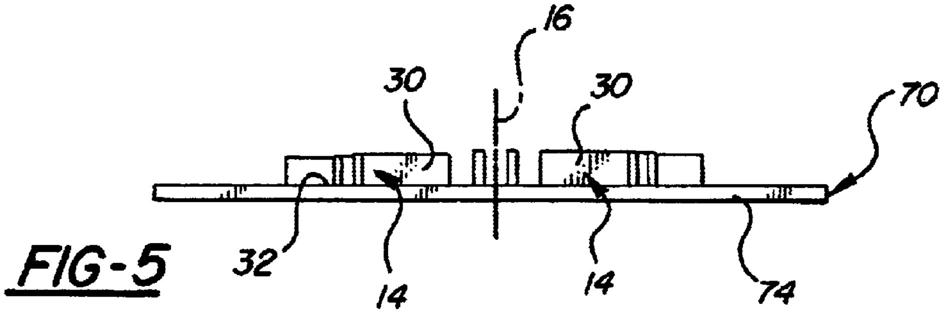
FIG. 5 is a side view of the stamped copper blank of FIG. 4.

Each conductor section 14 has two integral upturned conductor projections, shown at 30 in FIGS. 4 and 5. The conductor projections 30 extend from opposing diagonal edges of an upper surface 32 of the conductor section 14. When the carbon composition is overmolded onto the conductor section 14 array, the upturned projections 30 are embedded in the overmolded mass 20. After the carbon disk 20 is cut into segments 18, each of the upturned projections 30 of each conductor section 14 remains embedded in a corresponding one of the overmolded carbon segments 18. Because of their shape and location within the carbon segments 18 the embedded projections 30 reduce electrical resistance by increasing surface area contact between each conductor section 14 and its corresponding carbon segment 18. This is discussed below in detail.

Each conductor section 14 in the conductor section 14 array includes a circular conductor section aperture, shown at 34 in FIGS. 2 and 4. A conductor section aperture 34 is disposed approximately midway between an inner apex 36 and an outer semi-circumferential margin 38 of each conductor section 14. As shown in FIGS. 4 and 6—8, at the inner apex 36 of each conductor section 14 is a rectangular apex tab 40. As is best shown in FIGS. 1–3, a tang 42 extends integrally and radially outward from the outer semi-circumferential margin 38 of each conductor section 14.

As shown in FIGS. 4 and 5, the conductor projections 30 are bent-up portions that extend integrally upward from the conductor sections 14. Each conductor section 14 includes two such bent-up projections 30. Each bent-up projection 30 is elongated and rectangular and is bent-up (i.e., bent axially outward) from its respective conductor section 14 along a lower elongated margin.

Each conductor section 14 is embedded between the insulator hub 24 and one of the overmolded carbon segments 18. The tang 42 of each conductor section 14 protrudes radially outward from the insulator hub 24.

Figure 8:
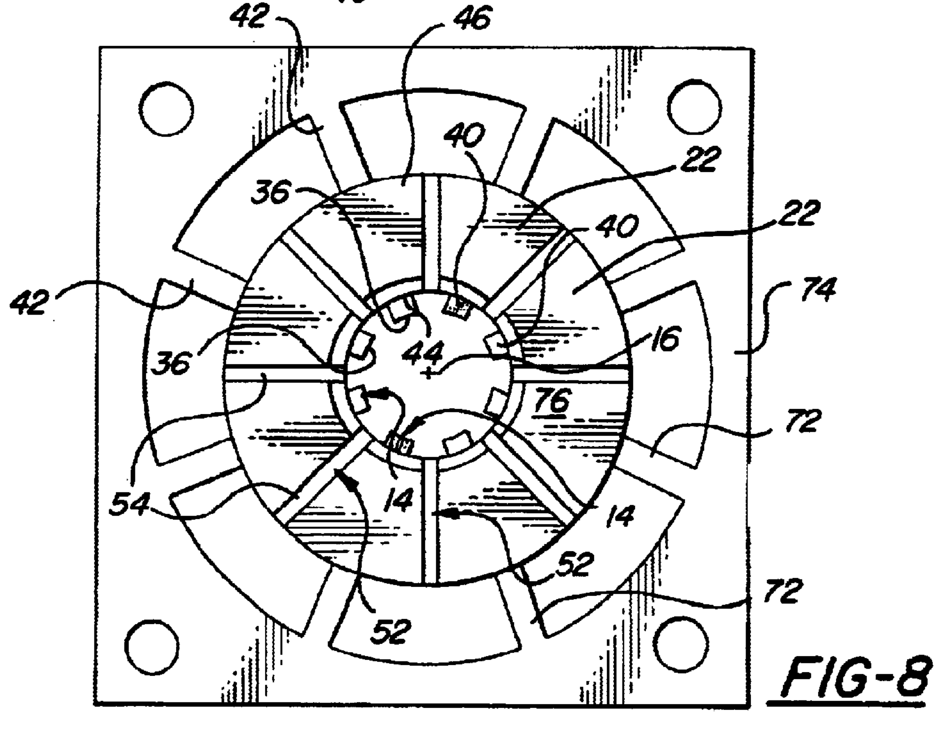
FIG. 8 is a bottom view of the carbon overmolded stamped blank of FIG. 6.

As is best shown in FIGS. 1 and 8, each carbon segment 18 has the general shape of a piece of a radially-cut circular pie, i.e., the same general shape as each conductor section 14. However, each carbon segment 18 is longer, wider and thicker than each conductor section 14. Each carbon segment 18 has an inner apex wall 44 and an outer semi-circumferential peripheral wall 46. Both the inner apex wall 44 and the outer circumferential wall 46 of each carbon segment 18 have stair-stepped profiles which define an inner shelf-detent 48 and an outer shelf-detent 50, respectively.

The carbon segments 18 are made of an injection-molded and hardened composition of graphite powder and carrier material with the graphite powder making up 50–80% of the total composition weight. The carrier material is preferably a polyphenylene sulfide (PPS) resin. While this composition is suitable for practicing the invention, other carbon compositions known in the prior art are suitable for use in the present invention depending upon the application in which the armature is used.

In other embodiments, metal particles may be embedded in the composition of carbon powder and carrier material to reduce electrical resistance between each conductor section and its corresponding carbon segment by improving carbon segment surface conductivity. The total metal content of the composition in such embodiments would be less than 25%. The metal particles could have one or more of a number of different configurations to include powder flakes. The metal particles would preferably be made of silver or copper.

Radial interstices, generally indicated at 52 in FIGS. 1, 2, 3, 7 and 8, separate the carbon segments 18. Each of the interstices 52 has an inner groove portion 54 and an outer slot portion 56. The inner groove portions 54 are formed during carbon overmolding. The outer slot portions 56 are formed by machining the commutating surface 22.

The insulator hub 24 has flat upper and lower surfaces disposed adjacent the upper and lower edges of the circumferential sidewall. The circumferential hub sidewall is disposed perpendicular to the upper and lower surfaces of the hub 24. As best shown in FIG. 2, the armature shaft aperture 26 includes upper 58 and lower 60 frusto-conical sections that taper inward from larger upper and lower outer diameters to a smaller inner diameter. An inner portion 62 of the armature shaft aperture 26 has a constant diameter, i.e., the smaller inner diameter, along its axial length.

Figure 2A:
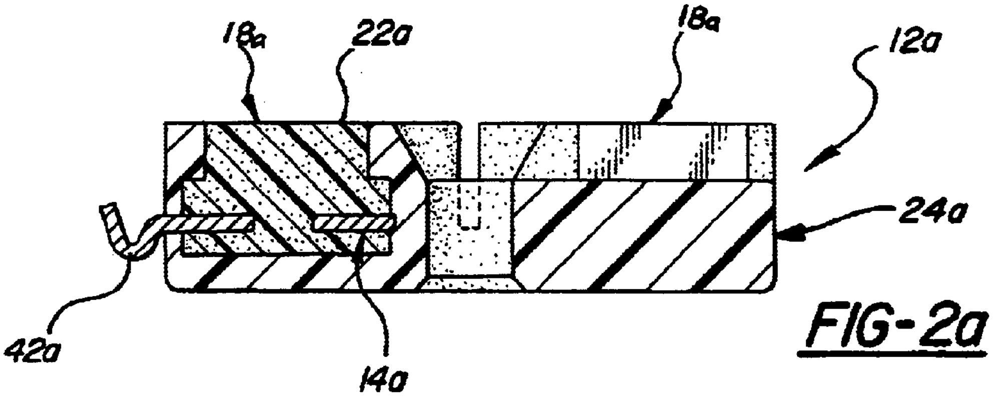
FIG. 2A is a cross-sectional view of an alternative commutator assembly construction to that shown in FIG. 2.

An alternative carbon segment commutator assembly construction is generally indicated at **12*a* in FIG. 2A. Reference numerals with the suffix "a" in FIG. 2A indicate alternative configurations of elements that also appear in the embodiment of FIG. 2. Where a portion of this description uses a reference numeral to refer to FIG. 2, We intend that portion of the description to apply equally to elements designated by numerals having the suffix "a" in FIG. 2A. As shown in FIG. 2A, each carbon segment 18*a* encases one of the conductor sections 14*a*. This arrangement maximizes both strength and electrical contact area between each carbon segment 18*a* and its corresponding conductor section 14*a***.

The inner groove portions 54 of the interstices 52 are filled with the insulator material of the hub 24. Hub insulator material is also disposed around the circumference of the carbon segment 18 array and encases the outer shelf-detent 50 of each carbon segment 18. Hub insulator material that forms the armature shaft aperture 26 also encases the inner shelf-detent 48 of each carbon segment 18.

As is best shown in FIG. 3, the insulator hub 24 includes a circumferential land 64 that extends completely around a circumferential sidewall of the insulator hub 24. The land 64 has an axial width that extends from the protruding conductor section tangs 42 to the unfilled outer slots 56 of the interstices 52. As shown in FIG. 9, the circumferential land 64 provides a circumferential sealing surface to mate with a corresponding surface 65 of a clamshell-type mold 67. The clamshell-type mold 67 is used in a final insulation overmolding process that is explained in detail below.

The hub insulator material comprises a glass-filled phenolic available from Rogers Corporation of Manchester Connecticut under the trade designation "Rogers 660." Other materials that would be suitable for use in place of Rogers 660 include high-quality engineering thermoplastics, i.e., thermoplastics that exhibit a high degree of stability when subjected to temperature changes.

In other embodiments, the annular arrays of conductor sections 14 and carbon segments 18 may include either more or less than eight sections, respectively. Also, the carrier material of the carbon composition may comprise a phenolic resin with up to 80% carbon graphite loading, a thermoset resin or a thermoplastic resin other than PPS, such as a liquid-crystal polymer (LCP). Both PPS and phenol type resins withstand long term exposure to fuels and alcohols. Other embodiments may also employ a commutator assembly 12 of the cylindrical or "barrel" type rather than the face-type commutator shown in the figures.

Figure 10:
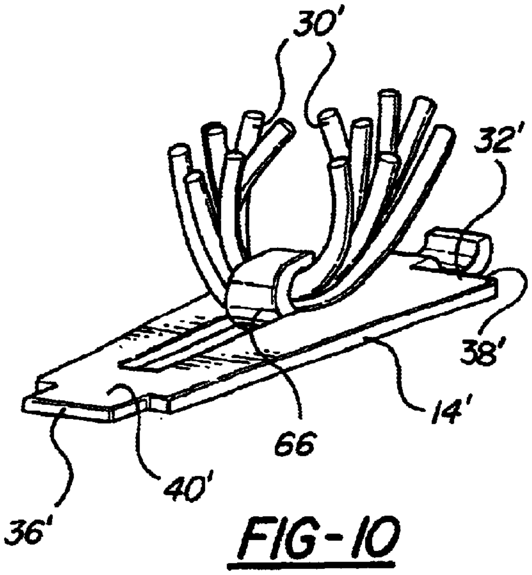
FIG. 10 is a perspective view of an alternative conductor section constructed according to the present invention.

In other embodiments the conductor section projections 30 may have any one or more of a large number of possible configurations designed to increase carbon to copper surface contact. For example, rather than comprising single bent-up portions of the conductor sections as shown at 14 in FIGS. 4 and 5, the Projections may instead comprise separate elements, crimped into place under a bent-over finger 66 extending from the conductor sections 14' as shown in FIG. 10. As is also shown in FIG. 10, the separate elements 30' may take the form of a plurality of narrow elongated metallic strands. In FIG. 10, a wire brush-like bundle of metallic strands is shown crimped to a conductor section 14' by bending a metal finger 66 away from the conductor section 14' and crimping the finger 66 over the wires.

Figure 11:
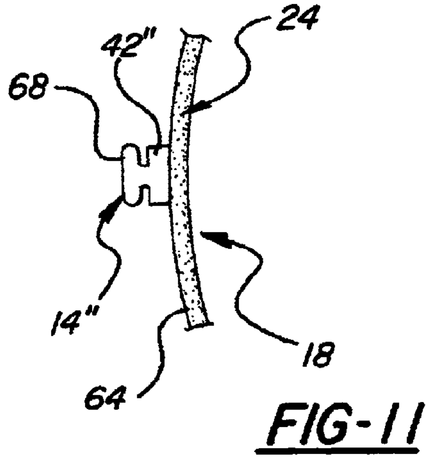
FIG. 11 is a top view of an alternative conductor section tang constructed according to the present invention.

As shown in FIG. 11, other embodiments could include tangs 42" formed with terminations 68 that each include a pair of slots for receiving insulated electrical wires, i.e., "insulation displacement"-type terminations. When an insulated wire is forced laterally into one of these slots, metal edges defining the sides of the slot cut through and force apart the wire insulation to expose and make electrical contact with the wire.

In embodiments using insulation-displacement type tang terminations 68, wires extending from the armature windings 69 could be forced into the respective terminals 42" either during or after armature winding process. This would eliminate the need to weld or heat-stake the wires to the tang terminations 68.

Figure 21:
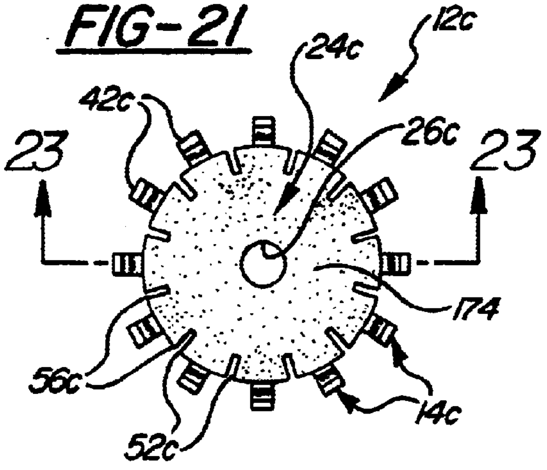
FIG. 21 is a top view of an alternative barrel-type carbon commutator assembly constructed according to the present invention.
Figure 22:
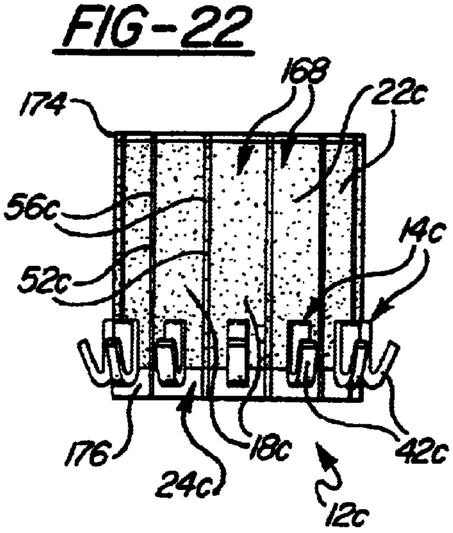
FIG. 22 is a front view of the alternative barrel-type carbon commutator assembly of FIG. 21.
Figure 23:
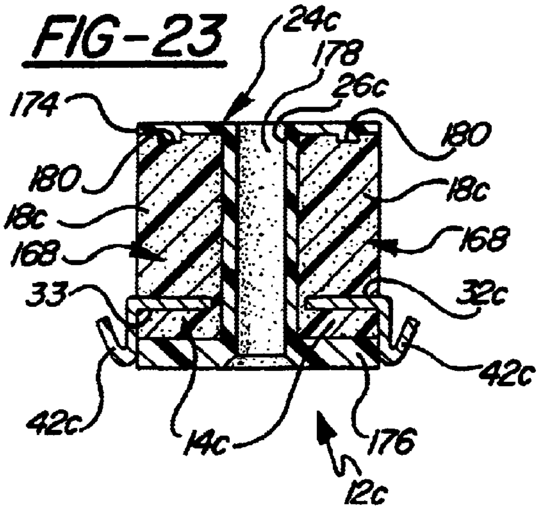
FIG. 23 is a cross-sectional view of the commutator assembly of FIG. 21 taken along line 23—23.
Figure 24:
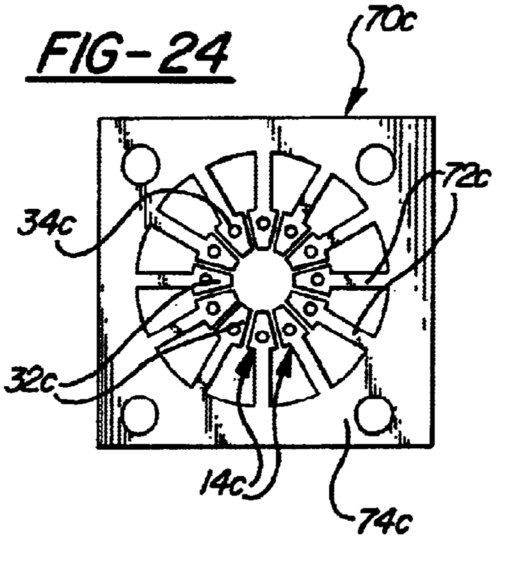
FIG. 24 is a top view of an array of copper conductor sections stamped from a square copper blank for forming a barrel-type commutator in accordance with the present invention.

As with the face-type commutator assembly 12 of FIGS. 1–10, the barrel-type overmolded carbon segment commutator assembly **12*c* shown in FIGS. 21–23 includes an annular array of twelve circumferentially spaced copper conductor sections 14*c* arranged around a rotational axis and an annular array of twelve circumferentially-spaced carbon segments 18*c*. However, unlike the face-type commutator assembly 12 the annular array of carbon segments 18*c* of the barrel-type commutator assembly 12*c* defines a segmented composite outer-circumferential or cylindrical commutating surface 22*c*** rather than a flat, circular commutating surface.

Each carbon n segment **18*c* is overmolded onto upper and lower surfaces 32*c*, 33 of a corresponding one of the conductor sections 14*c* forming an annular array of commutator sectors 168 as shown in FIGS. 22–26. Each conductor section 14*c* is embedded in one of the carbon segments 18*c* and includes a conductor tang 42*c* that extends radially outward from that carbon segment. As best shown in FIGS. 22 and 23 each conductor tang 42*c* is bent ninety degrees axially downward at the point where it protrudes from its respective carbon segment 18*c*** and is then bent diagonally upward and outward.

Figure 26:
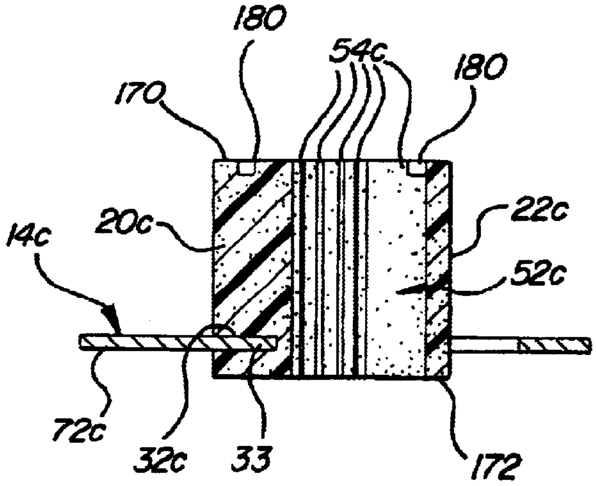
FIG. 26 is a cross-sectional side view of the carbon overmolded stamped blank of FIG. 25 taken along line 26—26 of FIG. 25.
Figure 27:
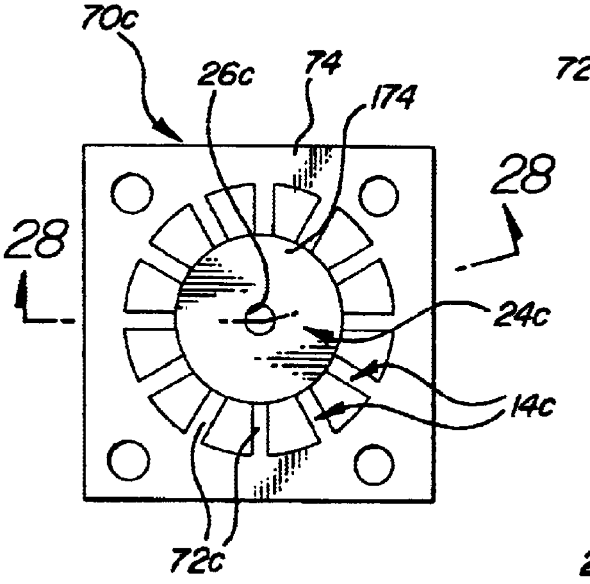
FIG. 27 is a top view of the carbon overmolded stamped blank of FIG. 25 overmolded with a hub of electrical insulating material.
Figure 28:
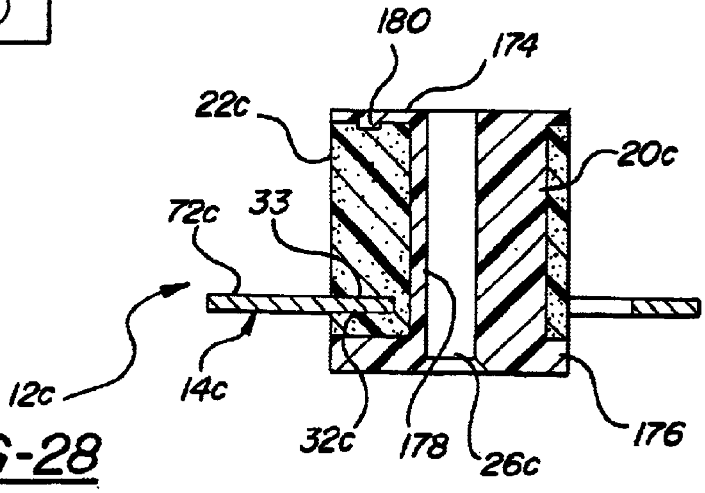
FIG. 28 is a cross-sectional side view of the insulator overmolded, carbon overmolded stamped blank of FIG. 27 taken along line 28—28 of FIG. 27.

As shown in FIG. 26 the annular array of commutator sectors 168 includes an axial top end surface 170, an axial base end surface 172 and an inner circumferential surface **76*c*. An overmolded insulator hub 24*c* is disposed on the axial top end, base end and inner circumferential surfaces 170, 172, 76*c* of the annular array of commutator sectors 168 to mechanically interlock the commutator sectors 168. As best shown in FIGS. 23 and 28, the insulator hub 24*c* is generally spool shaped and includes an upper annular disk-shaped portion 174, a lower annular disk-shaped portion 176 and a shaft portion 178 that connects the two disk-shaped portions 174, 176 and occupies a cylindrical space defined by the inner circumferential surface 76*c* of the commutator sectors 168. A central axial armature shaft aperture 26*c* passes through the shaft portion 178 of the insulator hub 24*c* and is disposed concentrically within the inner circumferential surface 76*c* of the commutator sectors 168**.

As shown in FIGS. 23, 25, 26 and 28, a generally circular coaxial retention groove 180 is disposed in the top end surface 170 of the annular array of commutator sectors 168 opposite the base end surface 172. A ring-shaped protrusion extends axially and concentrically downward from the upper disk-shaped portion 174 of the insulator hub and occupies the retention groove 180.

In practice, the face-type and barrel-type carbon commutator assemblies **12, 12*c* described above are each constructed by first forming the annular array of conductor sections 14, 14*c*. This is done by stamping the annular array from a single copper blank 70, 70*c* as shown in FIGS. 4, 5 for use in the face-type commutator assembly 12 and FIGS. 24, 25 and 27 for use in the barrel-type commutator assembly 12*c*. In each case, the stamping process leaves each conductor section 14, 14*c* connected by a thin, radially extending metal strip 72, 72*c* to an unstamped outer periphery 74, 74*c* of the copper blank 70, 70*c*. The thin copper strips 72, 72*c* allow the-outer periphery 74, 74*c* to act as a support ring that holds the conductor sections 14, 14*c*** in position, following stamping, for the subsequent steps in the commutator construction process.

Figure 6:
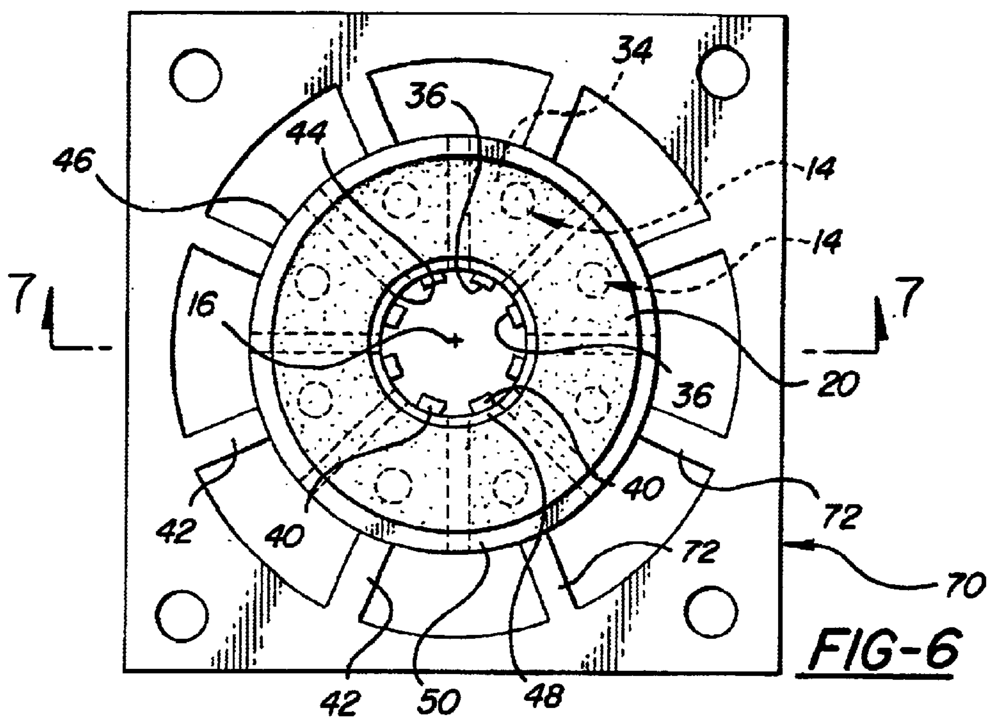
FIG. 6 is a top view of a carbon composition ring overmolded onto the stamped copper blank of FIG. 5 in accordance with the present invention.
Figure 7:
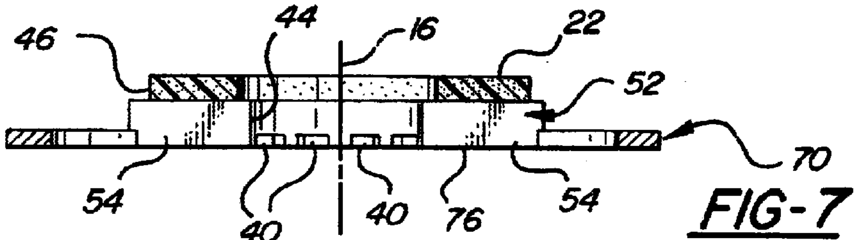
FIG. 7 is a cross-sectional side view of the carbon overmolded stamped blank of FIG. 6 taken along line 7—7 of FIG. 6.
Figure 25:
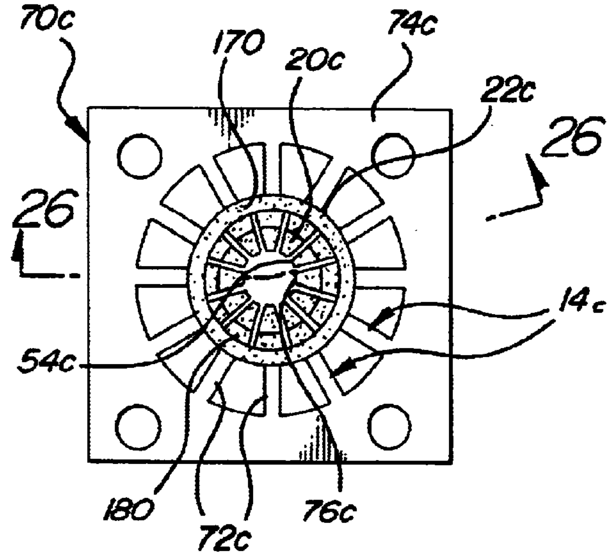
FIG. 25 is a top view of a carbon composition ring overmolded onto the stamped copper blank of FIG. 24 in accordance with the present invention.

The carbon overmold **20, 20*c* in then formed, as shown in FIGS. 6 and 8 for the face-type commutator assembly 12 and in FIGS. 25, 26 and 28 for the barrel-type commutator assembly 12*c*, by molding the carbon composition onto an upper surface 32, 32*c* of the annular conductor section 14, 14*c* array. The carbon composition is overmolded in such a fashion as to completely cover and mechanically interlock the conductor sections 14, 14*c*. In constructing the barrel-type commutator assembly 12***c* the carbon composition is also molded to an underside surface 33 of the conductor section 14*c* array. This effectively embeds the conductor sections 14*c* in the carbon overmold 20*c*.

In the carbon overmolding process, the carbon composition flows into each conductor section aperture 34, 34*c* and over each peripheral edge of each conductor section. However, in constructing the face-type commutator assembly and as is best shown in FIGS. 4, 6 and 8, the apex tab 40 of each conductor section 14 is left exposed by the carbon overmold 20. The apex tabs 40 extend radially inward into the armature aperture 26.

In constructing the face-type commutator assembly 12, the carbon composition also envelops the integral upturned conductor projections 30. This allows the projections 30 to extend through the thickness of an insulating surface skin that characteristically forms on exterior surfaces of a carbon overmold 20 as the carbon composition cures. By extending through the insulating skin, the projections 30 serve to reduce the electrical resistance of the contact by increasing the amount of surface area contact between carbon and copper.

In the carbon overmolding process for both a the face-type and the barrel-type commutator assemblies 12, 12*c* the radial groove portions 54, 54*c* of the interstices 52, 52*c* are molded into an inside surface 76, 76*c* of the carbon overmold 20, 20*c* opposite the commutating surface 22, 22*c* and between the conductor sections 14, 14*c*. In the case of the face-type commutator assembly. 12 the inside surface 76 is the flat base surface of the carbon overmold 20 that lies axially opposite the flat commutating surface 22. In the case of the barrel-type commutator assembly 12*c*, the inside surface 76*c* is the inner circumferential surface that lies radially opposite the outer circumferential commutating surface 22*c*. In each case, the grooves 54, 54*c* may, alternatively, be formed by other well-known means such as machining.

As shown in FIGS. 1–3 and 27 and 28, the hub 24, 24*c* is then formed by a second overmolding operation that covers the carbon overmold 20, 20*c* and conductor section 14, 14*c* array with the hub insulator material. During this hub overmolding process, the hub insulator material surrounds a portion of the carbon overmold 20, 20*c* and the conductor sections 14, 14*c*. The hub insulator material also completely fills the radial grooves 54, 54*c* that were formed in the inside surface 76, 76*c* of the carbon overmold 20, 20*c* in the carbon overmolding process, i.e., the inner groove portions 54, 54*c* of the interstices 52 52*c*. Only the commutating surface 22, 22*c* portion of the carbon overmold 20, 20*c* is left exposed after the hub overmolding operation is complete.

In the case of the face-type commutator assembly 12, as the insulator hub 24 is being overmolded, insulator material that is formed around the circumference of the carbon segment 18 array also flows over the outer shelf-detent 50 of each carbon segment 18 as is best shown in FIG. 2. Insulator material that is formed around the armature shaft aperture 26 flows over the inner shelf-detent 48 of each carbon segment 18. After the hub insulator material has hardened over the inner 48 and outer 50 shelf-detents of each carbon segment 18 and after the insulator has hardened under the carbon segments 18 and conductor sections 14, the hardened hub insulator material serves to mechanically retain the carbon segments 18 in relation to each other. In addition, the hardened hub insulator material secondarily retains the carbon segments 18 to their respective conductor sections 14.

In the case of the barrel-type commutator assembly 12*c*, as the insulator hub 24*c* is being overmolded, insulator material that is formed over the upper axial surface of the carbon overmold 20*c* also flows into the circular retention groove as is best shown in FIG. 28. After the hub insulator material has hardened in the retention groove and after the insulator has hardened, the hardened hub insulator material serves to mechanically retain the carbon segments 18, 18*c* in relation to each other in their annular array.

In constructing both the face-type and barrel-type commutator assemblies 12 12*c*, after the hub 24, 24*c* has been overmolded onto the carbon overmold 20, 20*c* and conductor section array, a portion of the outer periphery 74, 74*c* of the unstamped copper blank 70 is trimmed away from around the overmolded insulator hub 24, 24*c*. Once the periphery 74, 74*c* has been cut away, each conductor strip 72, 72*c* is bent to form a short tang 42, 42*c* of each connecting strip 72, 72*c* that is left protruding radially outward from an outer circumferential surface of the hub 24, 24*c*. The tangs 42, 42*c* are thus positioned and configured for use in connecting each conductor section 14, 14*c* to an armature wire extending from an armature winding.

As is best shown in FIGS. 1–3 and 21 and 23, the annular array of electrically-isolated carbon segments 18, 18*c* is then formed by machining the shallow radial slots 56, 56*c* inward from the exposed commutating surface 22, 22*c* of the carbon overmold 20, 20*c* to the underlying radial grooves 54, 54*c*. The slots 56, 56*c* can be formed by contact or non-contact machining techniques including, but not limited to, those using serrated tooth saws.

Because the radial slots 56, 56*c* are in direct overlying, i.e., axial or radial, alignment with the radial grooves 54, 54*c*, the radial slots 56, 56*c* can be cut completely through the carbon overmold 20, 20*c* and slightly into the insulator material that occupies the radial grooves 54, 54*c*. This ensures that the carbon overmold 20, 20*c* is cut through and the carbon segments 18, 18*c* completely separated and electrically isolated from each other. The insulator-filled radial grooves 54, 54*c* and the radial slots 56, 56*c* therefore meet within the commutator and form the interstices 52, 52*c* between the carbon segments 18, 18*c* as described above.

In the case of the face-type commutator assembly 12, the insulator-filled radial groove portion 54 of each interstice 52 constitutes approximately half of the axial depth of each interstice 52. In the case of the barrel-type commutator assembly 12*c*, the insulator-filled radial groove portion 54*c* of each interstice 52*c* constitutes approximately two-thirds of the radial depth o each interstice 52*c*. Consequently, in each case, to cut the remaining portion of each interstice 52 requires only a relatively shallow slot 56, 56*c*.

As is representatively shown in FIG. 9 for the face-type commutator assembly 12, the completed commutator assembly 12 is assembled to an armature assembly 80. The clamshell mold 67 is then positioned over the newly assembled commutator-armature assembly, generally indicated at 81 in FIG. 9. While positioning the clamshell mold 67 over the commutator-armature assembly 81, the sealing surface 65 of the clamshell mold 67 is made to seal around the circumferential land 64. Insulator material is then injected into the clamshell mold 67. Once the insulator material has cured, the clamshell mold 67 is removed. This final overmolding step is intended to protect copper armature windings 69 and other corrosion-prone elements from chemically reacting with ambient fluids such as gasoline.

A commutator manufacturing process accomplished according to the present invention involves no copper machining and, therefore, produces no copper shavings and chips that can lodge between carbon segments 18 18*c*. In addition, no copper is left exposed to react with ambient fluids such as gasoline.

Because a commutator assembly 12 constructed according to the present invention requires only shallow slots 56, 56*c* in its commutating surface 22, 22*c* to electrically isolate its carbon segments 18, 18*c*, the completed commutator assembly 12, 12*c* is stronger and better able to resist breakage. In the case of the face-type commutator assembly 12, as an alternative to a stronger commutator assembly, the hub 24 of the commutator assembly 12 may be designed to be axially shorter, allowing the commutator-armature assembly to either be designed axially shorter or to carry more armature windings 69. In other words, designers can capitalize on the shorter hub length by either shortening the overall commutator-armature assembly or including more armature windings 69.

One other advantage of the shallow slots 56 in the face-type commutator assembly 12 is that they allow for the circumferential land 64 between the tangs 42 and the slots 56. By providing a convenient sealing surface for a clam shell mold, the circumferential land 64 eliminates the need for a more complicated operation that involves masking the slots 56 to prevent the outflow of overmolding material into and through the sloes 56.

A first embodiment of a soldered (rather than carbon overmolded) barrel-style carbon segment commutator assembly construction for an electric motor is generally indicated at 100 in FIGS. 12–14. A second embodiment of the soldered barrel-style commutator assembly is generally indicated at 100' in FIG. 20. Reference numerals with the designation prime (') in FIG. 20 indicate alternative configurations of elements that also appear in the first embodiment. Unless indicated otherwise, where a portion of the following description uses a reference numeral to refer to the figures, we intend that portion of the description to apply equally to elements designated by primed numerals in FIG. 20.

The first embodiment of the barrel-type carbon-segment commutator assembly 100 comprises a generally circular annular array of twelve circumferentially spaced copper substrate sections generally indicated at 102 in FIGS. 12–14. The substrate sections 102 are arranged around a rotational axis shown at 104 in FIGS. 13 and 14. A cylindrical annular array of twelve circumferentially spaced carbon segments, shown at 106 in FIGS. 12 and 13, is formed of a conductive carbon composition. Each of the twelve carbon segments 106 is connected to a corresponding one of the twelve metallic substrate sections 102 to form twelve commutator sectors 102, 106. A circular array of 12 radial interstices, shown at 108 in FIGS. 12 and 14, physically separates and electrically isolates the composite commutator sectors 102, 106 from each other. A composite outer cylindrical surface of the annular carbon segment array defines a segmented cylindrical commutating surface, shown at 110 in FIG. 12, for making physical and electrical contact with a brush (not shown).

An insulator hub, generally indicated at 112 in FIGS. 12–14, is disposed within the annular carbon segment array and mechanically interlocks the carbon segments 106. As is best shown in FIGS. 13 and 14, the carbon segments 106 are electrically isolated from each other by the radial cuts 108 and are mechanically interconnected by the insulator hub 112.

As shown in FIG. 15, nickel and copper layers 114, 116 are plated onto an inner, i.e., the base end surface 118 of each carbon segment 106 with the copper layer 114 being plated over the nickel layer 116. The copper substrate sections 102 are soldered to the respective plated base end surfaces 118 of the carbon segments 106 to provide strong mechanical and electrical connections between the carbon segments 106 and their respective substrate sections 102.

As is best shown in FIG. 14, each copper substrate section 102 has a flat, tapered, generally trapezoidal main body 120 with an arcuate outer edge 122. As shown in FIGS. 12–14, a U-shaped terminal 124 extends radially and integrally outward from the arcuate outer edge 122 of each main body 120. A tang, best shown at 126 in FIG. 13, extends diagonally downward and outward from the main body 120 of each copper substrate section 102. Each tang 126 is embedded in the hub 112 to increase the strength of the mechanical lock between the substrate sections 102 and the hub 112.

As is explained in greater detail below, the substrate sections 102 are cut from a single generally circular annular copper substrate 128 that has been stamped and formed from a copper sheet. Each U-shaped terminal 124 is shaped to facilitate the attachment of coil wires (not shown) by soldering, the application of electrically conductive adhesive and/or physically wrapping such coil wires around the terminals 124.

The composition of the carbon segments 106 includes one or more materials selected from the group consisting of isostatic electrographite, carbon graphite, and fine-grained extruded graphite. The isostatic electrographite has the best properties but is also the most expensive. The carbon graphite is the cheapest of the three.

Each carbon segment 106 has a horizontal cross sectional shape that is generally trapezoidal and generally matches the shape of each main body portion 120 of the copper substrate sections 102. The carbon segments 106 each have a retention groove, shown at 130 in FIG. 13, formed into a top end 132 of each carbon segment 106 opposite the base end surface 118.

The nickel and copper layers 114, 116 completely and evenly coat the base end surface 118 of each carbon segment 106. As is described in greater detail below, a selective electroplating method is used to plate the nickel and copper layers 114, 116 onto the base end surfaces 118 of the carbon segments 106. This method deposits nickel ions deep within pores (not shown) in the base end surfaces 114 of the carbon segments 106. The pores in the base end surfaces 114 are characteristic of the carbon compositions used to form the carbon segments 106.

A layer of solder, shown at 132 in FIG. 15, that bonds and is disposed between the copper substrate sections 102 and the carbon segments 106 contains flux. The flux is mixed into the solder paste used in the soldering process to insure even flux distribution and improved mechanical and electrical contact between the carbon segments 106 and the copper substrate sections 102.

The hub 112 comprises a phenolic compound such as Rogers 660 and is overmolded into a unitary shape that includes an annular shaft portion shown at 134 in FIGS. 12–14. The annular shaft portion 134 extends between an annular cap portion shown at 136 in FIGS. 12 and 13 and an annular base portion shown at 138 in FIGS. 12–14. The shaft 134, cap 136 and base 138 are coaxially aligned and have a common inner circumferential surface forming a constant-diameter tube 140 sized to fit over an armature shaft (not shown) in an electric motor.

The cap portion 136 of the hub 112 extends radially outward from the shaft portion 134 into an annular shape that covers a majority of the upper ends 132 of the carbons segments 106. The cap portion 136 of the hub 112 also occupies the carbon segment retention grooves 130—mechanically locking the carbon segments 106 together.

Similar to the cap portion 136 of the hub 112, the hub base 138 extends radially outward from the shaft portion 134 into an annular shape that encases all but the U-shaped contact portions 124 of the copper substrate sections 102.

A soldered face-type carbon segment commutator assembly construction for an electric motor is generally indicated at 200 in FIGS. 29 and 30. The face-type commutator assembly 200 comprises a generally circular annular array of eight circumferentially spaced copper substrate sections generally indicated at 202 in FIGS. 29 and 30. The substrate sections 202 are arranged around a rotational axis shown at 204,in FIGS. 29 and 30. A cylindrical annular array of eight circumferentially-spaced carbon segments, shown at 206 in FIGS. 29 and 30, is formed of a suitable conductive carbon composition such as those described above with reference to the barrel-type carbon commutator assembly 100. Each of the eight carbon segments 206 is connected to a corresponding one of the eight metallic substrate sections 202 to form eight commutator sectors 202, 206. A circular array of eight radial interstices, shown at 208 in FIGS. 29 and 30, physically separate and electrically isolate the composite commutator sectors 202, 206 from each other. A composite circular surface formed by the annular carbon segment array defines a segmented cylindrical commutating surface, shown at 210 in FIGS. 29 and 30, for making physical and electrical contact with a brush (not shown).

An insulator hub, generally indicated at 212 in FIGS. 29 and 30, is disposed beneath the annular carbon segment array and mechanically interlocks the carbon segments 206. The carbon segments 206 are electrically isolated from each other by the radial cuts 208 and are mechanically interconnected by the insulator hub 212.

As shown in FIG. 15, nickel and copper layers 214, 216 are plated onto an inner, i.e., the base end surface 218 of each carbon segment 206 with the copper layer 214 being plated over the nickel layer 216. The copper substrate sections 202 are soldered to the respective plated base end surfaces 218 of the carbon segments 206 to provide strong mechanical and electrical connections between the carbon segments 206 and their respective substrate sections 202.

Each copper substrate section 202 is configured similar to the substrate sections 102 of the barrel-type commutator assembly 100 shown in FIG. 14 and described above. Each substrate section 202 includes a main body portion 220, a terminal 224 and a tang 226.

Each carbon segment 206 has a horizontal cross sectional shape that is generally trapezoidal and generally matches the shape of each main body portion 220 of the copper substrate sections 202.

The nickel and copper layers 214, 216 completely and evenly coat the base end surface 218 of each carbon segment 206. As mentioned above with respect to the barrel-type commutator 100 and as is described in greater detail below, a selective electroplating method is used to plate the nickel and copper layers 214, 216 onto the base end surfaces 118 of the carbon segments 106.

A layer of solder containing flux, shown at 232 in FIG. 15, bonds and is disposed between the copper substrate sections 102 and the carbon segments 106. The flux is mixed into the solder paste used in the soldering process to insure even f lux distribution and improved mechanical and electrical contact between the carbon segments 106 and the copper substrate sections 102.

As wit h the barrel-type commutator 100, the hub 212 of the face-type commutator assembly 200 comprises a phenolic compound such as Rogers 660 and is mold ed into a unitary shape t hat includes an annular shaft portion shown at 234 in FIG. 30. The annular shaft portion 234 extends integrally and axially downward from an annular base portion shown at 238 in FIG. 30. The shaft 234 and base 238 are coaxially aligned and have a common inner circumferential surface forming a constant-diameter tube 240 sized to fit over an armature shaft (not shown) in an electric motor.

The hub base 238 extends radially outward from the shaft portion 234 into an annular shape that encases all but the U-shaped contact portions 124 of the copper substrate sections 102.

In practice, a soldered barrel-style or face-type carbon commutator assembly 100, 200 may be constructed according to the invention by first stamping the above-described copper substrate 128, 228 from a copper sheet as shown in FIGS. 16 and 17 for a barrel commutator assembly 100. A carbon cylinder 142, 242 is then either machined or molded from a conductive carbon composition as shown in FIG. 18 for a barrel commutator assembly 100.

In constructing a barrel commutator assembly 100, a circular retention groove 144 is molded or machined into an outer or top end 146 of the carbon cylinder 142. The groove is concentric with the inner and outer diameters of the cylinder 142 and is disposed approximately midway between them.

In constructing either a barrel or face-type commutator assembly 100, 200, an inner, i.e., a base end 148, 248 of the carbon cylinder 142, 242 is metallized by electroplating a layer of nickel, shown at 114, 214 in FIG. 15, and a layer of copper, shown at 116, 216 in FIG. 15, to the base end surface 148, 248 of the carbon cylinder 142, 242. The metallic substrate 128, 228 is then soldered to the metallized base end 148, 248 of the carbon cylinder 142, 242.

In constructing the barrel commutator 100, the hub 112 is then formed within the carbon cylinder 142. In constructing the face commutator 200 the hub 212 may be formed to an underside surface of the metallic substrate 228 either before or after soldering the substrate 228 to the metallized base end surface 248 of the carbon cylinder 242.

For the barrel commutator assembly 100 the interstices 108 are then machined radially inward through the carbon cylinder 142 and the metallic substrate 128 to form the electrically isolated carbon/metal commutator sectors 102, 106. The over-molded hub 112 physically holds the commutator sectors 102, 106 together after the interstices 108 are formed.

For the face commutator assembly 200 the interstices 208 are machined axially inward through the carbon cylinder 242 and the metallic substrate 228 to form the electrically isolated carbon/metal commutator sectors 202, 206. The hub 212 physically holds the commutator sectors 202, 206 together after the interstices 208 are formed.

For both the barrel and face commutator assemblies 100, 200 a stencil printing process is used to apply solder, shown at 132, 232 in FIG. 15, to the base end surface 148, 248 of the carbon cylinder 142, 242. According to this process, the carbon cylinder 142, 242 is placed in a tray fixture of a stencil-printing machine (not shown). The stencil-printing machine is then cycled to place a stencil (not shown) over the base end surface 148, 248 of the carbon cylinder 142, 242. The stencil masks a center hole defined by the annular shape of the base end surface 148, 248. The machine then spreads a layer of solder paste over the stencil and exposed portions of the metallized carbon cylinder base end surface 148, 248 with a rubber squeegee. The machine then removes the stencil and excess solder paste from the carbon cylinder 142, 242. The stencil-printing machine used in this process is a De Hocurt Model EL-20.

After the stencil printing machine applies the solder paste, the substrate 128, 228 is concentrically aligned with the base end surface 148, 248 of the carbon cylinder 142, 242 and is placed flat against the solder-coated base end surface 148, 248 of carbon cylinder 142. The assembly 100 is then placed in a reflow oven (not shown) to insure that the solder 132, 232 has properly bonded the cylinder and substrate surfaces 142, 242, 128, 228.

As mentioned above, the nickel and copper layers 114, 214, 116, 216 are applied by electrolysis. More specifically, a brush-type selective plating process is used to electroplate the nickel and copper onto the carbon cylinder base end surface 118, 218. Brush-type selective plating includes the use of an electrolytic ion solution dispenser in the form of a hand held wand with an absorbent brush applicator at one end. An anode generally composed of the metal to be electroplated is selectively retained within a cavity formed in the wand. The carbon cylinder 142, 242 is charged as a cathode. This process results in a very high electrolytic current density that "throws" metal ions deep into the pores of the carbon cylinder cathode 142, 242 when the applicator is saturated with the ion solution and is drawn across the base end surface 148, 248 of the cylinder 142, 242. This results in excellent mechanical and electrical contact. A suitable brush-type selective plating process is disclosed in detail in U.S. Pat. No. 5,409,593. This patent is assigned to Sifco Industries, Inc. and is incorporated herein by reference.

An alternative process for metallizing the base end surface 148, 248 of the carbon cylinder 142, 242 includes forming the thin tin-based chemical reaction zone at the inner or base end surface 148, 248 or the carbon cylinder 142, 242 by first providing a metallic powder mixture of tin with particular transition metals (typically Cr) added to typically approximately 5 wt. % in an appropriate organic vehicle or binder to form a metalization paste that is painted or screen printed onto the base end surface 148, 248. The paste is then dried and fired generally to 800–900° C. for roughly 10–15 minutes. Carbon monoxide gas (CO) is included in the firing atmosphere to facilitate a bonding/wetting reaction. Firing the paste in a nitrogen atmosphere generates sufficient CO locally due to binder burnout. This procedure yields a direct metallurgical bond of the tin-rich composition to the base end surface 148, 248 forming the tin-based chemical reaction zone. The metallized surface can be safely reflowed at 232° C. (the melting point of tin) without dewetting from the base end surface 148, 248. Through reflowing conventional solder compositions into the metallization layer, the base end surface 148, 248 can be converted into a solder layer, shown at 250 in FIG. 31, that is tenaciously adherent onto the base end surface 148, 248. A suitable metallization process that includes the above steps is available from Oryx Technology Corporation under the trade name Intragene™.

To form the hub 112 for the barrel-type commutator assembly 100, an insert molding process is used to mold phenolic compound over, under and within the annular carbon cylinder 142 and metallic substrate 128. In the process, the phenolic compound flows into and fills the retention groove 144.

For both the barrel and the face-type commutator assemblies, 100, 200 the individual copper substrate sections 102, 202 are formed by stamping the circular annular copper substrate 128, 228 from a copper sheet. As described above, each of the copper substrate sections 102, 202 includes a generally trapezoidal main body portion shown at 120 in FIG. 16 for the barrel commutator assembly 100. A terminal 124, 224 extends radially outward and a tang 126, 226 extends diagonally downward and radially outward from the main body portion of each substrate section 102, 202. The terminals 124, 224 and the tangs 126, 226 are best shown in FIG. 13 for the barrel-type commutator assembly and FIG. 30 for the face-type commutator assembly 200.

Before they are cut from the substrate 128, 228 the copper substrate main body portions 120 are partially separated from each other by radially outwardly extending slots shown at 150 in FIG. 16 for the barrel-type commutator assembly. The slots 150 extend radially outward from an inside diameter 152 of the annular cooper substrate 128, 228. The substrate sections 102, 202 are connected by circumferentially extending connector tabs, shown at 154 in FIG. 16, that bridge radial outer ends of the outwardly extending slots 150.

After the circular annular copper substrate 128, 228 is stamped from a copper sheet, the tangs 126, 226 are formed by bending a radially inner tip 156 of each main body portion 120, 220 downward and radially outward from its original position in plane with the rest of the main body portion 120, 220. In addition, each terminal 124, 224 is formed into its upright U-shape by bending.

In constructing the barrel-type commutator assembly 100 the radial interstices shown at 108 in FIGS. 12 and 14 are machined radially inward from the outer circumferential surface 110 of the carbon cylinder 142 through the shaft portion 134 of the hub 112. As the radial interstices 108 are machined, the circumferentially-extending substrate section connector tabs 154 are cut through to the outwardly extending radial slots 150, separating and electrically isolating the metallic substrate sections 102.

According to the second embodiment of the soldered barrel-style commutator, an inner groove portion 158 of each radial interstice is either machined or molded radially outward into an inner circumferential surface 160' of the carbon cylinder 142'. As shown in FIG. 20, the base end surface 148' of the carbon cylinder is then electroplated and is coated with solder paste in the stencil-printing machine. During stencil printing, the inner groove portions 158 are masked by the stencil that the stencil printing machine places over the metabolized base end surface 148' of the carbon cylinder 142' prior to solder paste application. The stencil prevents solder 132 from lodging in the inner groove portions 158.

Once the carbon cylinder 142' has been soldered to the substrate 128', the hub (not shown in FIG. 20) is overmolded. During overmolding, the phenolic compound is allowed to flow into and fill the inner groove portions 158. Outer slot portions of the interstices 108 are then machined radially inward from an outer circumferential surface 110' of the carbon cylinder 142' to the insulator-filled inner groove portions 158. The outer slot portions of the interstices 108 are machined to align with and join the insulator-filled inner groove portions 158 to complete the radial interstices 108. Therefore, each radial interstice 108 has an inner groove portion 158 filled with the insulating phenolic compound and an unfilled outer slot portion .

Other embodiments of the barrel-type commutator assembly 100 may include a number of poles other than twelve. Likewise, other embodiments of the face-type commutator assembly 200 may include a number of poles other than eight. In addition, conducting metals other than copper and nickel may be used to electroplate the inner, i.e., the base end surface 118 of the carbon segments 106. Other embodiments may also employ insulation displacement terminals similar to the terminal 14" shown in FIG. 11. In other embodiments, the hub 112 may comprise a suitable insulating composition other than a phenolic compound.

This is an illustrative description of the invention using words of description rather than of limitation. Obviously, many modifications and variations of this invention are possible in light of the above teachings. Within the scope of the claims, one may practice the invention other than as described.

We claim:

1. A method for making a carbon commutator assembly, the method including the steps of:

providing a metallic substrate;

providing an annular carbon cylinder of a conductive carbon composition, the cylinder having an inner surface and an outer commutating surface;

providing a tin-based metalization layer including a chemical reaction zone at the inner surface of the carbon cylinder by:

forming a metallic powder mixture of tin with a transition metal;

forming a metalization paste by mixing the metallic powder mixture with an organic binder;

applying the metalization paste onto the base end surface; and firing the paste to 800–900° C. in an atmosphere including carbon monoxide;

converting the metalization layer into a solder layer by reflowing a solder composition into the metalization layer;

providing an insulator hub in a position supporting the metallic substrate and carbon cylinder; and segmenting the carbon cylinder by forming radial interstices through the carbon cylinder after providing the insulator hub, the metallic substrate being cut as each of the radial interstices is formed, thus forming a carbon/metal commutator array comprising electrically isolated carbon/metal commutator sectors.

2. The method as set forth in claim 1 in which forming the metallic powder mixture includes providing Chromium as the transition metal.

3. The method as set forth in claim 2 in which forming the metallic powder mixture includes providing sufficient chromium to constitute approximately 5% of the mixture by weight.

4. The method as set forth in claim 1 in which applying the metalization paste includes screen printing the paste onto the base end surface.

5. The method as set forth in claim 1 in which firing the paste includes:

firing the paste in a nitrogen atmosphere; and generating carbon monoxide through binder burnout.

6. The method as set forth in claim 1 in which providing the hub includes overmolding insulator material onto the carbon cylinder and metallic substrate in an insert molding process to form the hub.

7. A method for making a carbon commutator assembly, the method including the steps of:

providing a metallic substrate;

forming an annular carbon cylinder of a conductive carbon composition, the cylinder having an outer commutating surface disposed on an outer circumferential surface of the carbon cylinder and an inner surface disposed at an axial bottom end of the cylinder;

metalizing the inner surface of the carbon cylinder by bonding a first layer of metallic material to the inner surface of the carbon cylinder;

soldering the metallic substrate to the metalized inner surface of the carbon cylinder;

providing an insulator hub in a position supporting the metallic substrate and carbon cylinder;

segmenting the carbon cylinder by forming radial interstices through the carbon cylinder after providing the insulator hub, the metallic substrate being cut as each of the radial interstices is formed, thus forming a carbon/metal commutator array comprising electrically isolated carbon/metal commutator sectors; and overmolding insulator material onto the carbon cylinder and metallic substrate in an insert molding process to form the hub, the overmolding step including flowing insulator material into a retention groove provided in an axial top end of the cylinder.

8. The method as set forth in claim 7 in which metalizing the inner surface includes bonding a second layer of metallic material to the inner surface of the carbon cylinder.

9. The method as set forth in claim 7 in which metalizing the inner surface includes electroplating a layer of metallic material to the inner surface of the carbon cylinder.

10. The method as set forth in claim 7 in which metalizing the inner surface includes using a brush-type selective electroplating process.

11. The method as set forth in claim 7 in which soldering the substrate to the carbon cylinder includes applying a solder paste to the inner surface, the solder paste containing flux.

12. The method as set forth in claim 7 in which soldering the substrate to the carbon cylinder includes using a stencil printing process to apply solder to the inner surface of the carbon cylinder, the stencil printing process including the steps of:

placing a stencil over the inner surface of the carbon cylinder;

providing a layer of solder on the stencil and exposed portions of the carbon cylinder inner surface; and removing the stencil from the carbon cylinder.

13. The method as set forth in claim 7 in which soldering the substrate to the carbon cylinder includes placing the assembly in a reflow oven.

14. The method as set forth in claim 7 in which:

the method includes the additional step of forming an inner groove portion of each radial interstice radially outward into the carbon cylinder from an inner circumferential surface of the carbon cylinder before providing a hub;

the overmolding step includes flowing insulator material into the inner grooves; and providing the radial interstices includes machining outer slot portions of the interstices radially inward into the carbon cylinder from an outer circumferential surface of the carbon cylinder to the insulator-filled inner groove portions.

15. The method as set forth in claim 7 in which providing the metallic substrate includes stamping a generally circular annular metallic substrate from a sheet of metal.

16. The method as set forth in claim 15 in which stamping includes stamping a circular annular array of metallic substrate sections from the sheet of metal, each section including a main body portion, a terminal radially outwardly extending from each main body portion and a tang inwardly extending from each main body portion, the main body portions partially defined by radially inwardly extending slots, the substrate main body portions connected by connector tabs.

17. The method as set forth in claim 16 in which stamping the circular annular array of metallic substrate sections includes stamping an outwardly extending terminal having an insulation displacement configuration.

18. The method as set forth in claim 16 in which segmenting the carbon cylinder includes machining through the connector tabs.

* * * * *